United States Patent
Kotler et al.

(10) Patent No.: US 10,192,176 B2
(45) Date of Patent: Jan. 29, 2019

(54) MOTIVATION OF TASK COMPLETION AND PERSONALIZATION OF TASKS AND LISTS

(75) Inventors: Matthew J. Kotler, Sammamish, WA (US); Marta Rey-Babarro, Seattle, WA (US); Ned B. Friend, Seattle, WA (US); Erez Kikin-Gil, Redmond, WA (US); Charles W. Parker, Sammamish, WA (US); Igor Zaika, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 1166 days.

(21) Appl. No.: 13/271,173

(22) Filed: Oct. 11, 2011

(65) Prior Publication Data
US 2013/0091453 A1    Apr. 11, 2013

(51) Int. Cl.
G06Q 10/06    (2012.01)
G06Q 30/02    (2012.01)

(52) U.S. Cl.
CPC ..... *G06Q 10/0631* (2013.01); *G06Q 30/0209* (2013.01)

(58) Field of Classification Search
CPC combination set(s) only.
See application file for complete search history.

(56) References Cited

U.S. PATENT DOCUMENTS

| | | |
|---|---|---|
| 3,964,195 A | 6/1976 | Jordan |
| 4,162,610 A | 7/1979 | Levine |
| 4,769,796 A | 9/1988 | Levine |
| 4,819,191 A | 4/1989 | Singh et al. |
| 5,023,851 A | 6/1991 | Murray et al. |
| 5,428,784 A | 6/1995 | Cahill, Jr. |
| 5,602,963 A | 2/1997 | Bissonnette et al. |
| 5,623,404 A | 4/1997 | Collins et al. |

(Continued)

FOREIGN PATENT DOCUMENTS

| | | |
|---|---|---|
| CN | 1755618 A | 4/2006 |
| CN | 1755621 A | 4/2006 |

(Continued)

OTHER PUBLICATIONS

Mistry, Pranav, et al. "Augmenting Sticky Notes as an I/O Interface", MIT Media Laboratory, 20 Ames Street, MA 02139. Published Jul. 14, 2009, http://fluid.media.mit.edu/assets/_pubs/p2217_mistry.pdf, 10 pages.

(Continued)

*Primary Examiner* — Hien L Duong
(74) *Attorney, Agent, or Firm* — Merchant & Gould P.C.

(57) ABSTRACT

Personalized task management is provided. A "doodling" zone or pane is provided in association with an electronic task interface that allows for entry of sketches, notes, the playing of games, and the like in association with entry, editing and use of task or list items in the task interface. In addition, task items entered into the task interface may be associated with other information, including previously entered or accomplished tasks, third party task content, enterprise task content, or other content. As tasks are completed, a completing user may be rewarded with a variety of on-display animations, gifts, reward items and/or other positive feedback.

11 Claims, 13 Drawing Sheets

(56) References Cited

U.S. PATENT DOCUMENTS

| | | | |
|---|---|---|---|
| 5,692,125 A | 11/1997 | Schloss et al. | |
| 5,709,410 A | 1/1998 | Reeves, Jr. | |
| 5,745,110 A | 4/1998 | Ertemalp et al. | |
| 5,790,974 A | 8/1998 | Tognazzini | |
| 5,860,067 A | 1/1999 | Onda et al. | |
| 5,899,979 A | 5/1999 | Miller et al. | |
| 5,936,625 A | 8/1999 | Kahl et al. | |
| 5,960,406 A | 9/1999 | Rasansky et al. | |
| 5,970,466 A | 10/1999 | Detjen et al. | |
| 6,012,037 A | 1/2000 | Yoshikawa | |
| 6,047,260 A | 4/2000 | Levinson | |
| 6,177,905 B1 | 1/2001 | Welch et al. | |
| 6,187,448 B1 | 2/2001 | Hanoka et al. | |
| 6,256,651 B1 | 7/2001 | Tuli | |
| 6,300,950 B1 | 10/2001 | Clark et al. | |
| 6,307,544 B1 | 10/2001 | Harding | |
| 6,369,840 B1 | 4/2002 | Barnett et al. | |
| 6,446,041 B1 | 9/2002 | Reynar et al. | |
| 6,466,236 B1 | 10/2002 | Pivowar et al. | |
| 6,480,830 B1 | 11/2002 | Ford et al. | |
| 6,525,749 B1 | 2/2003 | Moran et al. | |
| 6,549,939 B1 | 4/2003 | Ford et al. | |
| 6,578,005 B1 | 6/2003 | Lesaint et al. | |
| 6,640,230 B1 | 10/2003 | Alexander | |
| 6,650,735 B2 | 11/2003 | Burton et al. | |
| 6,680,675 B1 | 1/2004 | Suzuki | |
| 6,701,345 B1 | 3/2004 | Carley et al. | |
| 6,757,362 B1 | 6/2004 | Ulmer et al. | |
| 6,769,120 B1 | 7/2004 | Rodriguez | |
| 6,850,609 B1 | 2/2005 | Schrage | |
| 6,925,603 B1 | 8/2005 | Naito et al. | |
| 6,988,128 B1 | 1/2006 | Alexander et al. | |
| 7,047,498 B2 | 5/2006 | Lui | |
| 7,082,402 B2 | 7/2006 | Slapikoff et al. | |
| 7,103,559 B2 | 9/2006 | Worthington | |
| 7,139,999 B2 | 11/2006 | Bowman-Amuah et al. | |
| 7,200,210 B2 | 4/2007 | Tang | |
| 7,236,932 B1 | 6/2007 | Grajski | |
| 7,299,450 B2 | 11/2007 | Livshits et al. | |
| 7,356,770 B1 | 4/2008 | Jackson | |
| 7,366,991 B1 | 4/2008 | Snapkauskas et al. | |
| 7,467,198 B2 | 12/2008 | Goodman et al. | |
| 7,472,357 B1 | 12/2008 | Satterfield et al. | |
| 7,565,340 B2 | 7/2009 | Herlocker et al. | |
| 7,587,668 B2 | 9/2009 | Bala | |
| 7,603,292 B1 | 10/2009 | Bragg et al. | |
| 7,610,365 B1 | 10/2009 | Kraft et al. | |
| 7,688,322 B2 | 3/2010 | Kapler et al. | |
| 7,703,048 B2 | 4/2010 | Alford et al. | |
| 7,797,267 B2 | 9/2010 | Horvitz | |
| 7,797,638 B2 | 9/2010 | Dev et al. | |
| 7,809,599 B2 | 10/2010 | Andrew et al. | |
| 7,818,197 B2 | 10/2010 | Cho et al. | |
| 7,846,023 B2 * | 12/2010 | Evans | A63F 13/12 463/42 |
| 7,865,927 B2 | 1/2011 | Brodersen et al. | |
| 7,885,844 B1 * | 2/2011 | Cohen | G06Q 10/10 |
| 7,975,239 B2 | 7/2011 | Bellotti et al. | |
| 8,069,422 B2 * | 11/2011 | Sheshagiri | H04L 12/2803 715/744 |
| 8,108,206 B2 | 1/2012 | Hufnagel | |
| 8,161,386 B1 | 4/2012 | Mark | |
| 8,370,767 B2 | 2/2013 | Kotler et al. | |
| 8,374,864 B2 | 2/2013 | Kerr | |
| 8,375,320 B2 | 2/2013 | Kotler et al. | |
| 8,381,088 B2 | 2/2013 | Kikin-Gil et al. | |
| 8,386,929 B2 | 2/2013 | Zaika | |
| 8,682,667 B2 | 3/2014 | Haughay | |
| 9,009,592 B2 | 4/2015 | Friend et al. | |
| 2001/0035883 A1 | 11/2001 | Kobayashi | |
| 2001/0052108 A1 | 12/2001 | Bowman-Amuah | |
| 2002/0016729 A1 | 2/2002 | Breitenbach et al. | |
| 2002/0054118 A1 | 5/2002 | Ishizaki et al. | |
| 2002/0054130 A1 | 5/2002 | Abbott et al. | |
| 2002/0118225 A1 | 8/2002 | Miksovsky | |
| 2002/0194048 A1 | 12/2002 | Levinson | |
| 2002/0194246 A1 | 12/2002 | Moskowitz et al. | |
| 2003/0059000 A1 | 3/2003 | Burton et al. | |
| 2003/0065544 A1 | 4/2003 | Elzinga et al. | |
| 2003/0103415 A1 | 6/2003 | Bates et al. | |
| 2003/0120717 A1 | 6/2003 | Callaway et al. | |
| 2004/0049385 A1 | 3/2004 | Lovance et al. | |
| 2004/0059736 A1 | 3/2004 | Willse et al. | |
| 2004/0078776 A1 | 4/2004 | Moon et al. | |
| 2004/0111265 A1 | 6/2004 | Forbes | |
| 2004/0125150 A1 | 7/2004 | Adcock et al. | |
| 2004/0139435 A1 | 7/2004 | Cui et al. | |
| 2004/0187082 A1 | 9/2004 | Hathaway | |
| 2004/0260974 A1 | 12/2004 | Livshits | |
| 2004/0268225 A1 | 12/2004 | Walsh et al. | |
| 2005/0013863 A1 | 1/2005 | Lim et al. | |
| 2005/0022297 A1 | 2/2005 | Orologio et al. | |
| 2005/0041667 A1 | 2/2005 | Miller et al. | |
| 2005/0044066 A1 | 2/2005 | Hooper et al. | |
| 2005/0091578 A1 * | 4/2005 | Madan | G06F 17/241 715/201 |
| 2005/0108074 A1 | 5/2005 | Bloechl et al. | |
| 2005/0138559 A1 | 6/2005 | Santos-gomez et al. | |
| 2005/0138631 A1 | 6/2005 | Bellotti et al. | |
| 2005/0165631 A1 | 7/2005 | Horvitz | |
| 2005/0198031 A1 | 9/2005 | Pezaris et al. | |
| 2005/0222971 A1 | 10/2005 | Cary | |
| 2005/0256754 A1 | 11/2005 | Nastacio | |
| 2005/0268234 A1 | 12/2005 | Rossi et al. | |
| 2005/0268503 A1 | 12/2005 | Sassenberg | |
| 2005/0278632 A1 | 12/2005 | Mckethan | |
| 2006/0041460 A1 | 2/2006 | Aaron | |
| 2006/0059253 A1 | 3/2006 | Goodman et al. | |
| 2006/0069604 A1 | 3/2006 | Leukart et al. | |
| 2006/0074844 A1 | 4/2006 | Frankel et al. | |
| 2006/0106854 A1 | 5/2006 | Haigh et al. | |
| 2006/0117378 A1 | 6/2006 | Tam et al. | |
| 2006/0136121 A1 | 6/2006 | Eisen et al. | |
| 2006/0136280 A1 * | 6/2006 | Cho et al. | 705/9 |
| 2006/0136832 A1 | 6/2006 | Keller et al. | |
| 2006/0167686 A1 | 7/2006 | Kahn | |
| 2006/0184880 A1 | 8/2006 | Bala | |
| 2006/0225076 A1 | 10/2006 | Longobardi | |
| 2006/0236269 A1 | 10/2006 | Borna | |
| 2006/0239248 A1 | 10/2006 | Hawk et al. | |
| 2006/0242586 A1 | 10/2006 | McGlinchey et al. | |
| 2006/0259511 A1 | 11/2006 | Boerries et al. | |
| 2006/0265294 A1 | 11/2006 | De Sylva | |
| 2007/0028170 A1 | 2/2007 | Wessling et al. | |
| 2007/0055936 A1 | 3/2007 | Dhanjal et al. | |
| 2007/0066364 A1 | 3/2007 | Gil et al. | |
| 2007/0073810 A1 | 3/2007 | Adams et al. | |
| 2007/0074121 A1 | 3/2007 | Mullender et al. | |
| 2007/0089071 A1 | 4/2007 | Zinn et al. | |
| 2007/0100619 A1 | 5/2007 | Purho | |
| 2007/0106931 A1 | 5/2007 | Vartiainen et al. | |
| 2007/0130026 A1 | 6/2007 | Opray et al. | |
| 2007/0130186 A1 | 6/2007 | Ramsey et al. | |
| 2007/0130369 A1 | 6/2007 | Nayak | |
| 2007/0143376 A1 | 6/2007 | McIntosh | |
| 2007/0156643 A1 | 7/2007 | Dev et al. | |
| 2007/0162907 A1 | 7/2007 | Herlocker et al. | |
| 2007/0168378 A1 | 7/2007 | Dev et al. | |
| 2007/0188319 A1 | 8/2007 | Upton | |
| 2007/0233487 A1 | 10/2007 | Cohen et al. | |
| 2007/0245229 A1 | 10/2007 | Siedzik et al. | |
| 2007/0282658 A1 | 12/2007 | Brintle | |
| 2007/0288279 A1 | 12/2007 | Haugen et al. | |
| 2008/0005055 A1 | 1/2008 | Horvitz | |
| 2008/0005679 A1 * | 1/2008 | Rimas-Ribikauskas et al. | 715/745 |
| 2008/0033780 A1 | 2/2008 | Lee et al. | |
| 2008/0040673 A1 | 2/2008 | Zuckerberg et al. | |
| 2008/0046862 A1 | 2/2008 | Sattler et al. | |
| 2008/0065701 A1 | 3/2008 | Lindstrom et al. | |
| 2008/0076400 A1 | 3/2008 | Moosavi et al. | |
| 2008/0082651 A1 | 4/2008 | Singh et al. | |
| 2008/0091782 A1 | 4/2008 | Jakobson | |
| 2008/0102889 A1 | 5/2008 | May et al. | |

(56) References Cited

U.S. PATENT DOCUMENTS

| | | |
|---|---|---|
| 2008/0162160 A1 | 7/2008 | Singh et al. |
| 2008/0175104 A1 | 7/2008 | Grieb et al. |
| 2008/0186226 A1* | 8/2008 | Ratnakar ............... 342/357.1 |
| 2008/0215564 A1 | 9/2008 | Bratseth |
| 2008/0263165 A1 | 10/2008 | Hui et al. |
| 2008/0270240 A1* | 10/2008 | Chu ............... G06Q 10/06375 705/14.11 |
| 2008/0276987 A1 | 11/2008 | Flood |
| 2008/0281901 A1 | 11/2008 | Lusher et al. |
| 2009/0013250 A1 | 1/2009 | Hsieh et al. |
| 2009/0013255 A1 | 1/2009 | Yuschik et al. |
| 2009/0055415 A1 | 2/2009 | Golds et al. |
| 2009/0099845 A1 | 4/2009 | George |
| 2009/0102676 A1 | 4/2009 | Hoffmann et al. |
| 2009/0125332 A1 | 5/2009 | Martin |
| 2009/0157617 A1 | 6/2009 | Herlocker et al. |
| 2009/0157653 A1 | 6/2009 | Herlocker et al. |
| 2009/0165844 A1 | 7/2009 | Dutta |
| 2009/0187458 A1* | 7/2009 | Agrawal ............... 705/9 |
| 2009/0193415 A1 | 7/2009 | Narayanaswami et al. |
| 2009/0216757 A1 | 8/2009 | Sen et al. |
| 2009/0229652 A1 | 9/2009 | Mapel et al. |
| 2009/0282346 A1 | 11/2009 | Bechtel et al. |
| 2009/0287718 A1 | 11/2009 | Motoyama et al. |
| 2009/0287731 A1 | 11/2009 | Motoyama et al. |
| 2009/0300494 A1 | 12/2009 | Cottingham et al. |
| 2009/0305774 A1* | 12/2009 | Farone ............... A63F 13/12 463/25 |
| 2009/0319608 A1 | 12/2009 | Anil et al. |
| 2009/0320025 A1 | 12/2009 | Ferguson et al. |
| 2009/0322791 A1 | 12/2009 | Wu |
| 2009/0327020 A1 | 12/2009 | de Vries et al. |
| 2010/0004921 A1 | 1/2010 | Hufnagel et al. |
| 2010/0012190 A1 | 1/2010 | Goto et al. |
| 2010/0070877 A1 | 3/2010 | Scott et al. |
| 2010/0324948 A1* | 12/2010 | Kumar et al. ............... 705/7 |
| 2011/0022387 A1 | 1/2011 | Hager |
| 2011/0099549 A1* | 4/2011 | Sriraghavan et al. ......... 718/100 |
| 2011/0106736 A1* | 5/2011 | Aharonson ........ G06Q 10/109 706/12 |
| 2011/0112881 A1* | 5/2011 | Malhotra et al. ............ 705/7.21 |
| 2011/0126275 A1 | 5/2011 | Anderson et al. |
| 2011/0208524 A1 | 8/2011 | Haughay |
| 2011/0237329 A1* | 9/2011 | Evans ............... A63F 13/12 463/30 |
| 2011/0296322 A1 | 12/2011 | Dhanjal et al. |
| 2011/0313803 A1 | 12/2011 | Friend et al. |
| 2011/0314375 A1* | 12/2011 | Zaika et al. ............... 715/708 |
| 2011/0314418 A1 | 12/2011 | Kotler et al. |
| 2011/0320979 A1* | 12/2011 | Rainisto ............... G06F 3/0486 715/825 |
| 2012/0035925 A1 | 2/2012 | Friend et al. |
| 2012/0059842 A1* | 3/2012 | Hille-Doering ..... G06F 17/3064 707/769 |
| 2012/0260177 A1 | 10/2012 | Sehrer |
| 2012/0308970 A1* | 12/2012 | Gillespie ............... G09B 5/06 434/236 |
| 2012/0311585 A1* | 12/2012 | Gruber ............... H04W 4/02 718/100 |
| 2013/0014026 A1* | 1/2013 | Beringer et al. ............ 715/753 |
| 2013/0074076 A1* | 3/2013 | Lindenfeld ............ G06Q 10/06 718/100 |
| 2014/0173602 A1* | 6/2014 | Kikin-Gil et al. ............ 718/100 |

FOREIGN PATENT DOCUMENTS

| | | |
|---|---|---|
| CN | 1920814 A | 2/2007 |
| CN | 101071442 A | 11/2007 |
| CN | 101099152 A | 1/2008 |
| CN | 101366021 A | 2/2009 |
| CN | 101369324 A | 2/2009 |
| EP | 681250 A2 | 11/1995 |
| EP | 1008946 A1 | 6/2000 |
| EP | 1311102 A1 | 5/2003 |
| EP | 1650699 A1 | 4/2006 |
| JP | H11259568 A | 9/1999 |
| JP | 2010044511 A | 2/2010 |
| KR | 20040072755 A | 8/2004 |
| KR | 20070070374 A | 7/2007 |
| KR | 20070111590 A | 11/2007 |
| KR | 20090065225 A | 6/2009 |
| RU | 2005120363 A | 1/2007 |
| WO | 113069 A1 | 2/2001 |
| WO | 3107129 A2 | 12/2003 |
| WO | 2007/127643 A2 | 11/2007 |
| WO | 2007123589 A1 | 11/2007 |

OTHER PUBLICATIONS

Radi, Harald, et al. "Towards Alternative User Interfaces for Capturing and Managing Tasks with Mobile Devices", MoMM 2008, Nov. 24-26, 2008, Linz, Austria. http://www.mayrhofer.eu.org/downloads/pubications/MoMM2008-Towards-Mobile-Task-Management.pdf, 4 pages.

Smartcode, "Dynamic Notes 3.46", Published 2008, http://dynamic-notes.smartcode.com/info.html, 2 pages.

SnapFiles, "SmartToDo Personal Task Manager", Published Jan. 23, 2009, http://www.snapfiles.com/get/smarttodo.html, 3 pages.

Back, Maribeth, et al. Prototyping a tangible tool for design: Multimedia e-paper sticky notes, FX Palo Alto Laboratory, Palo Alto, California. Published 2009. http://www.fxpal.com/publications/FXPAL-PR-09-499.pdf, 12 pages.

Conley, K. et al. Towel: Towards an Intelligent To-Do List, IN: the AAAI Spring Symposium on Interaction Challenges for Artificial Assistants, 7 pgs., 2007.

Pauline M. Berry et al., A Personalized Calendar Assistant, http://ai.sri.com/~gervasio/pubs/berry-ss04.pdf, 6pgs, 2004.

Andrew Faulring et al., Visualizing and Manipulating Complex Calendar Scheduling Information, http://scholar.google.com/scholar?hl=en&lr=&q=cache:XQivLN8U0XkJ:www.cs.cmu.edu/~faulring/papers/cal-sched-dis06.pdf+tasks+calendar+organize+, 8pgs., 2006.

Victoria Bellotti et al., What a to-do: studies of task management towards the design of a personal task list manager, http://portal.acm.org/citation.cfm?id=985692.985785, 8pgs., Apr. 2004.

SolutionWatch, "8apps: Social Networking for Productive People", Published 2010, http://www.solutionwatch.com/546/8apps-social-networking-for-productive-people/, 18 pages.

Myer, Karen, et al., "An Intelligent Personal Assistant for Task and Time Management", Aug. 7, 2006, http://www.eecs.umich.edu/~pollackm/distrib/aimag06.pdf, 19 pages.

Chris Pratley, Getting Organized Using Onenote Note Flags, Published Apr. 23, 2005, http://blogs.msdn.com/chris_prately/archive/2005/04/23/getting-organized-using-onenote-note-flags.aspx, 15 pages.

Kreifelts, Thomas et al., "Sharing To-Do Lists with a Distributed Task Manager", published in ECSCW '93, Proc. Third European Conference on Computer-Supported Cooperative Work on Sep. 15-17, 1993, Milano, Italy. Reprinted by permissions of Kluwer Academic Publishers, http://citeseerx.ist.psu.edu/viewdoc/download;jessionid=8058BDB7D6CD9F588E557272F2BB39C8?doi=10.1.1.38.2100&rep=rep1&type=pdf, 16 pages.

Pratley, Chris. Getting organized using OneNote note flags—Published Date: Apr. 23, 2005, http://blogs.msdn.com/b/chris_pratley/archive/2005/04/23/getting-organized-using-onenote-note-flags.aspx, 4 Pages.

To-Do List Pro—Published Date: Jul. 23, 2010, http://appshopper.com/productivity/to-do-list-pro-time-tracker, 2 Pages.

Scribble Lite—iPhone App Review—Published Date: Oct. 21, 2009, http://www.appshouter.com/iphone-app-review-%E2%80%93-scribble-lite/, 11 Pages.

Popov, Dmitri. Scribble Away with OI Notepad for Android—Published Date: Mar. 30, 2010, http://www.linux-magazine.com/Online/Blogs/Productivity-Sauce-Dmitri-s-open-source-blend-of-productive-computing/Scribble-Away-with-OI-Notepad-for-Android, 2 Pages.

What's new in Google Docs?—Published Date: Oct 29, 2009, http://www.google.com/google-d-s/whatsnew.html, 4 Pages.

(56) References Cited

OTHER PUBLICATIONS

"Now Software Releases Now Up-to-Date(R) & Contact(R) for Windows," PR Newswire: 1. Oct. 14, 2003. ProQuest. Web. Jul. 9, 2014.

Patricia Cardoza, Using Microsoft Office Outlook 2003, Special Edition Using Series, Que Publishing, 2004.

Cozzi, A. et al. Activity Management as a Web Service.—IBM Systems Journal, vol. 45, No. 4, 2006—ieeexplore.ieee.org.

Voida, Stephen. Exploring User Interface Challenges in Supporting Activity-Based Knowledge Work Practices. smartech.gatech.edu Aug. 2008.

Dragunov, Anton et al. TaskTracer: A Desktop Environment to Support Multi-Tasking Knowledge Workers. Proceedings of the 10th . . . , Jan. 2005—dl.acm.org.

Moran, Thomas P. Unified Activity Management: Explicitly Representing Activity in Work-Support Systems, Proceedings of the European Conference on Computer . . . , Sep. 2005—Citeseer.

Mori, Giulio et al. CTTE: Support for Developing and Analyzing Task Models for Interactive System Design. IEEE Transactions on Software Engineering, vol. 28, No. 8, Aug. 2002—ieeexplore.ieee.org.

Nichols, Jeffrey, et al. Creating a Lightweight User Interface Description Language: An Overview and Analysis of the Personal Universal Controller Project—ACM Transactions on Computer-Human Interaction, vol. 16, No. 4, Article 17, Nov. 2009—dl.acm.org.

Kaptelinin, Victor. UMEA: Translating Interaction Histories into Project Contexts—Proceedings of the SIGCHI conference on Human . . . , Apr. 2003 vol. No. 5, Issue No. 1—dl.acm.org.

Ly E: "Distributed Java Applets for Project Management on the Web", IEEE Internet Computing, Institute of Electrical and Electronics Engineers, US, vol. 1, No. 3, 1997, pp. 21-26, XP002272931, ISSN: 1089-7801, DOI: 10.1109/4236.589191.

Kersten et al.: "Using task context to improve programmer productivity", Proceedings SIGSOFT 06 / FSE-14 SIGSOFT 2006—14th International Symposium on the Foundations of Software Engineering, Nov. 5-11, 2006.

Stahl et al.: "Here and Now: A User-Adaptive and Location-Aware Task Planner", Jan. 2007.

"Appointment Scheduling Software Overview", Retrieved From <<https://web.archive.org/web/20060522011244/http://www.appointmentsoft.com/>>, Retrieved on: Oct. 31, 2006, 3 Pages.

"Jott Assistant", Retrieved From: <<https://web.archive.org/web/20100713062803/http://jott.com/jott/jott-assistant.html>>, Retrieved on: Jul. 21, 2010, 4 Pages.

"Natural Language and Outlook", Retrieved From: <<htp://www.shahine.com/omar/CommentView.guid.23c6e3e7-e16a-46cb-be9f-e01d10c7edf4.aspx>>, Retrieved on: Sep. 6, 2006, 11 Pages.

"Outlook Follow Up Flags", Retrieved From: <<http://www.outlookwise.com/OutlookWise/Article_Outlook_Follow_Up_Flags.htm>>, Retrieved on: Feb. 24, 2010, 5 Pages.

"We Need a Dynamic Friend Permission System", Retrieved From: <<https://web.archive.org/web/20081108033512/https://laserlike.com/2008/11/01/we-need-a-dynamic-friend-permission-system/>>, Nov. 1, 2008, 5 Pages.

"Webcrossing Neighbors provides private labeled social network, personal spaces & groups, bringing groups closer together", Retrieved From: >>https://web.archive.org/web/20100212234033/http://webcrossing.com/Home/webcrossing_neighbors.htm>>, Retrieved on: Feb. 19, 2010, 4 Pages.

"Search Report Issued in European Application No. 08705858.2"dated Nov. 7, 2011, 7 Pages.

"Office Action Issued in European Patent Application No. 08727568.1", dated Dec. 7, 2015, 6 Pages.

"Search Report Issued in European Application No. 08727568.1", dated Nov. 4, 2011, 6 Pages.

"Final Office Action Issued in U.S. Appl. No. 11/422,837", dated May 6, 2015, 18 Pages.

"Final Office Action Issued in U.S. Appl. No. 11/422,837", dated Aug. 3, 2011, 18 Pages.

"Final Office Action Issued in U.S. Appl. No. 11/422,837", dated Jul. 19, 2010, 16 Pages.

"Non Final Office Action Issued in U.S. Appl. No. 11/422,837", dated Feb. 8, 2010, 14 Pages.

"Non Final Office Action Issued in U.S. Appl. No. 11/422,837", Feb. 18, 2011, 14 Pages.

"Non Final Office Action Issued in U.S. Appl. No. 11/422,837", dated Aug. 15, 2014, 18 Pages.

"Final Office Action Issued in U.S. Appl. No. 11/625,914", dated Apr. 9, 2013, 31 Pages.

"Final Office Action Issued in U.S. Appl. No. 11/625,914", dated Aug. 10, 2011, 31 Pages.

"Final Office Action Issued in U.S. Appl. No. 11/625,914", dated Nov. 9, 2010, 22 Pages.

"Non Final Office Action Issued in U.S. Appl. No. 11/625,914", Jun. 8, 2010, 23 Pages.

"Non Final Office Action Issued in U.S. Appl. No. 11/625,914", dated Mar. 2, 2011, 24 Pages.

"Non Final Office Action Issued in U.S. Appl. No. 11/625,914", dated Aug. 15, 2012, 32 Pages.

"Non Final Office Action Issued in U.S. Appl. No. 11/625,914", dated Jul. 17, 2014, 37 Pages.

"Final Office Action Issued in U.S. Appl. No. 11/625,916", dated Oct. 18, 2011, 39 Pages.

"Non Final Office Action Issued in U.S. Appl. No. 11/625,916", dated Jun. 11, 2010, 29 Pages.

"Non Final Office Action Issued in U.S. Appl. No. 11/625,916", dated Mar. 30, 2011, 35 Pages.

"Non Final Office Action Issued in U.S. Appl. No. 11/625,916", dated Aug. 15, 2012, 43 Pages.

"Search Report Issued in European Application No. 11798662.0", dated Jul. 28, 2016, 8 Pages.

"Office Action Issued in European Patent Application No. 11798663.8", dated Oct. 29, 2014, 4 Pages.

"Search Report Issued in European Application No. 11798663.8", dated Feb. 24, 2014, 7 Pages.

"Search Report Issued in European Application No. 11798665.3", dated Mar. 24, 2016, 7 Pages.

"Office Action Issued in European Patent Application No. 11798684.4", dated Feb. 28, 2018, 10 Pages.

"Supplementary Search Report Issued in European Patent Application No. 11798684.4", dated Mar. 24, 2016, 8 Pages.

"Office Action Issued in European Patent Application No. 11798687.7", dated Nov. 15, 2017, 5 Pages "Search Report Issued in European Application No. 11798687.7", dated Mar. 6, 2014, 6 Pages.

"Non Final Office Action Issued in U.S. Appl. No. 12/820,600", dated May 9, 2012, 16 Pages.

"Non Final Office Action Issued in U.S. Appl. No. 12/820,676", dated Apr. 10, 2012, 16 Pages.

"Final Office Action Issued in U.S. Appl. No. 12/820,721", dated Nov. 1, 2012, 24 Pages.

"Final Office Action Issued in U.S. Appl. No. 12/820,721", dated Jun. 2, 2015, 27 Pages.

"Final Office Action Issued in U.S. Appl. No. 12/820,721", dated Sep. 14, 2017, 40 Pages.

"Final Office Action Issued in U.S. Appl. No. 12/820,721", dated Sep. 30, 2016, 40 Pages.

"Non Final Office Action Issued in U.S. Appl. No. 12/820,721", dated Mar. 7, 2017, 38 Pages.

"Non Final Office Action Issued in U.S. Appl. No. 12/820,721", dated Jan. 21, 2014, 27 Pages.

"Non Final Office Action Issued in U.S. Appl. No. 12/820,721", dated Oct. 16, 2014, 24 Pages.

"Non Final Office Action Issued in U.S. Appl. No. 12/820,721", dated Mar. 27, 2012, 23 Pages.

"Non Final Office Action Issued in U.S. Appl. No. 12/820,721", dated Mar. 9, 2016, 36 Pages.

"Non Final Office Action Issued in U.S. Appl. No. 12/820,790", dated Apr. 23, 2012, 15 Pages.

"Non Final Office Action Issued in U.S. Appl. No. 12/820,914", dated Apr. 24, 2012, 15 Pages.

(56) References Cited

OTHER PUBLICATIONS

"Non Final Office Action Issued in U.S. Appl. No. 13/271,826", dated Jan. 3, 2014, 19 Pages.
"Decision on Re-examination Issued in Chinese Patent Application No. 200880002613.1", dated Aug. 25, 2011, 2 Pages.
"First Office Action Issued in Chinese Application No. 200880002613.1", dated Aug. 13, 2010, 8 Pages.
"Office Action Issued in Chinese Patent Application No. 200880002613.1", dated Mar. 8, 2011, 9 Pages.
"Second Office Action Issued in Chinese Patent Application No. 200880002613.1", dated Mar. 31, 2012, 8 Pages.
"First Office Action and Search Report Issued in Chinese Application No. 201180030304.7", dated Dec. 25, 2014, 12 Pages.
"Second Office Action Issued in Chinese Patent Application No. 201180030304.7", dated Aug. 28, 2015, 7 Pages.
"Third Office Action Issued in Chinese Patent Application No. 201180030304.7", dated Mar. 7, 2016, 10 Pages.
"First Office Action and Search Report Issued in Chinese Application No. 201180030411.X", dated Jan. 7, 2015, 12 Pages.
"Second Office Action Issued in Chinese Patent Application No. 201180030411.X", dated Sep. 6, 2015, 15 Pages.
"First Office Action and Search Report Issued in Chinese Application No. 201180030417.7", dated Dec. 29, 2014, 15 Pages.
"Second Office Action Issued in Chinese Patent Application No. 201180030417.7", dated Jul. 29, 2015, 8 Pages.
"First Office Action and Search Report Issued in Chinese Application No. 201180030418.1", dated Mar. 31, 2015, 12 Pages.
"Second Office Action Issued in Chinese Patent Application No. 201180030418.1", dated Dec. 4, 2015, 13 Pages.
"Third Office Action Issued in Chinese Patent Application No. 201180030418.1", dated Apr. 14, 2016, 7 Pages.
"Fifth Office Action Issued in Chinese Patent Application No. 201180030471.1", dated Sep. 27, 2017, 5 Pages.
"First Office Action and Search Report Issued in Chinese Patent Application No. 201180030471.1", dated May 21, 2015, 14 Pages.
"Fourth Office Action Issued in Chinese Patent Application No. 201180030471.1", dated Mar. 29, 2017, 15 Pages.
"Second Office Action and Search Report Issued in China Patent Application No. 201180030471.1", dated Jan. 15, 2016, 18 Pages.
"Third Office Action Issued in Chinese Patent Application No. 201180030471.1", dated Jul. 18, 2016, 12 Pages.
"First Office Action and Search Report Issued in Chinese Patent Application No. 201210384596.0", dated Mar. 2, 2015, 12 Pages.
"Second Office Action and Search Report Issued in Chinese Patent Application No. 201210384596.0", dated Aug. 6, 2015, 10 Pages.
"Office Action Issued in Russian Patent Application No. 2012155842", dated Jun. 18, 2015, 7 Pages.
Alfred C. "Speech-to-Text application introduced in Motorola Droid Android Phone", Apr. 24, 2010, 5 Pages.
Bellotti, et al. "Taking Email to Task: The Design and Evaluation of a Task Management Centered Email Tool", In Proceedings of the SIGCHI Conference on Human Factors in Computing Systems, Volume No. 5, Issue No. 1, Apr. 5, 2003, pp. 345-352.
Bergman, et al. "A Personal Email Assistant", Software Technology Laboratory, HP Laboratories Palo Alto, Aug. 22, 2002, 23 Pages.
Dey, et al. "CybreMinder: A Context-Aware System for Supporting Reminders", In Proceedings of the 2nd International Symposium on Handheld and Ubiquitous Computing, Sep. 25, 2000, pp. 172-186.
Elaarag, et al. "Web-Based Systems for Communication and Scheduling", In Proceedings of IEEE Professional Communication Conference, IPCC, Sep. 21, 2003, 8 Pages.
Faulring, et al. "Availability Bars for Calendar Scheduling", In Proceedings of Extended Abstracts on Human Factors in Computing Systems, Apr. 22, 2006, pp. 760-765.
Fleshbourne, Daniel "Microsoft Gives Mobile Devices a New Voice", Retrieved From: <<https://www.neowin.net/news/microsoft-gives-mobile-devices-a-new-voice/>>, Nov. 3, 2003, 2 Pages.
Hakkila, et al. "User Experiences on Combining Location Sensitive Mobile Phone Applications and Multimedia Messaging", In Proceedings of the 3rd international conference on Mobile and ubiquitous multimedia, Oct. 27, 2004, pp. 179-185.
Kaushik, et al. "Observations From a Case Study on User Adaptive Reminders for Medication Adherence", In Pervasive Computing Technologies for Healthcare, Jan. 30, 2008, pp. 250-253.
Microsoft Corporation "Change an Event into an Appointment", Retrieved From: <<https://support.office.com/en-gb/article/change-an-appointment-meeting-or-event-29b44f7a-8938-4b99-b98d-3efcf45f7613>>, Retrieved on: Sep. 6, 2006, 1 Page.
Mills, Elinor "Google offers free voice-activated local search", Retrieved From: <<https://www.cnet.com/news/google-offers-free-voice-activated-local-search/>>, Apr. 6, 2007, 2 Pages.
Mills, Elinor "Message Sling offers voice-to-text message service", http://news.cnet.com/8301-17939_109-10035531-2.html», CNET.com, Sep. 8, 2008, 1 page.
Modi, et al. "CMRadar: A Personal Assistant Agent for Calendar Management", In Proceedings of the 6th International Bi-Conference Workshop on Agent-Oriented Information Systems, Jun. 8, 2004, pp. 169-181.
O'Neill, Nick "10 Privacy Settings Every Facebook User Should Know", Retrieved From: <<http://www.allfacebook.com/2009/02 facebook-privacy/>>, Feb. 2, 2009, 152 Pages.
"International Search Report & Written Opinion Issued in PCT Application No. PCT/US2008/050767", dated May 19, 2008, 10 Pages.
"International Search Report & Written Opinion Issued in PCT Application No. PCT/US2008/050820", dated May 22, 2008, 10 Pages.
"International Search Report & Written Opinion Issued in PCT Application No. PCT/US2011/040772", dated Feb. 9, 2012, 9 Pages.
"International Search Report & Written Opinion Issued in PCT Application No. PCT/US2011/040790", dated Feb. 17, 2012, 9 Pages.
"International Search Report & Written Opinion Issued in PCT Application No. PCT/US2011/040793", dated Nov. 25, 2011, 9 Pages.
"International Search Report & Written Opinion Issued in PCT Application No. PCT/US2011/040970", dated Mar. 9, 2012, 8 Pages.
"International Search Report & Written Opinion Issued in PCT Application No. PCT/US2011/040987", dated Nov. 25, 2011, 9 Pages.
Peoplecube "Scheduling Software for Shared Resources—Resource Scheduler", Retrieved on: Apr. 12, 2006, 2 Pages.
Pollack, et al. "There's More to Life Than Making Plans: Plan Management in Dynamic, Multiagent Environments", AI Magazine, Dec. 15, 1999, pp. 71-84.
Talbot, Steve "Event Calendar for Connnunity Broadband Network", In report on a fourth-year undergraduate project, May 26, 2004, 49 Pages.
Warren, Christina "Send E-mail and SMS Messages Using Voice Commands With Vlingo for iPhone", Retrieved From: <<https://mashable.com/2010/03/04/vlingo-iphone/#MbSYUTL4hkqc>>, Apr. 4, 2010, 6 Pages.

\* cited by examiner

MOTIVATION OF TASK COMPLETION AND PERSONALIZATION OF TASKS AND LISTS

BACKGROUND

With the advent of computers and computer software, a number of advancements have been made to help people manage both their working and non-working lives. To help people who are trying to juggle numerous tasks at work, at home, and in between, electronic tasks and calendaring programs have been developed to assist with the often daunting task of maintaining, tracking and remembering all the things that must be accomplished on a daily basis. Unfortunately, a great number of people are often reduced to handwriting a multitude of notes to themselves on scraps of paper, on notepads, on "sticky" notes and the like. It is not uncommon to see numerous notes adhered to a person's desk, computer screen, home refrigerator, and the like to remind the person to handle one or more tasks. Even when persons have access to and utilize electronic task or calendaring programs, they often fail to enter needed tasks, neglect (fail to process or accomplish) previously entered tasks, and fail to update tasks as they are processed and/or accomplished.

It is with respect to these and other considerations that the present invention has been made.

SUMMARY

Embodiments of the present invention solve the above and other problems by providing personalized task management. According to one embodiment, a "doodling" zone or pane is provided in association with an electronic task interface. The "doodling" zone or pane allows for entry of sketches, notes, the playing of games, and the like. Use of the "doodling" zone adds a point of interest to the associated task interface for inviting users to be willing to spend more time working with the task interface to enter, update, and/or process or accomplish tasks. Use of the "doodling" zone or panes may allow for a short respite from work in the associated task interface by allowing the user to play a game, create a sketch, or to enter a word or phrase that may be used to jog the user's memory relative to a presently entered task or to a task the user plans to enter at a different time. Furthermore, use of the "doodling" zone or pane allows for the creation and storage of notes in association with entered task items that may be useful in explaining or providing context to one or more entered tasks.

According to another embodiment, task items entered into the task interface may be associated with other information, including previously entered or accomplished tasks, third party task content, enterprise task content, or other content (e.g., contacts, calendar items, documents, photographs, music, and the like). Such other information may be used for adding to, supplementing, replacing, or enhancing one or more task items in order to personalize the one or more task items for the user. Task items similarly may be personalized based on dates, times, seasons, and the like.

According to another embodiment, motivation for completion of tasks may be provided. As tasks are completed, a completing user may be rewarded via a variety of on-display animations and/or other positive feedback. In addition, enterprise-based or third party rewards, such as recognition via public badges, commendations, compliments and bragging comments for task completion on enterprise intranets and/or electronic social gathering points or on public Internet-based web pages and/or social gathering points such as FACEBOOK sites/pages, and the like. In addition, product coupons, time off, and the like may be automatically provided to a user upon completion of a prescribed number of tasks to motivate the user to not only use the task interface, but to accomplish tasks entered into the task interface.

The details of one or more embodiments are set forth in the accompanying drawings and description below. Other features and advantages will be apparent from a reading of the following detailed description and a review of the associated drawings. It is to be understood that the following detailed description is explanatory only and is not restrictive of the invention as claimed.

This summary is provided to introduce a selection of concepts in a simplified form that are further described below in the detailed description. This summary is not intended to identify key features or essential features of the claimed subject matter, nor is it intended as an aid in determining the scope of the claimed subject matter.

DETAILED DESCRIPTION

Figure 1:
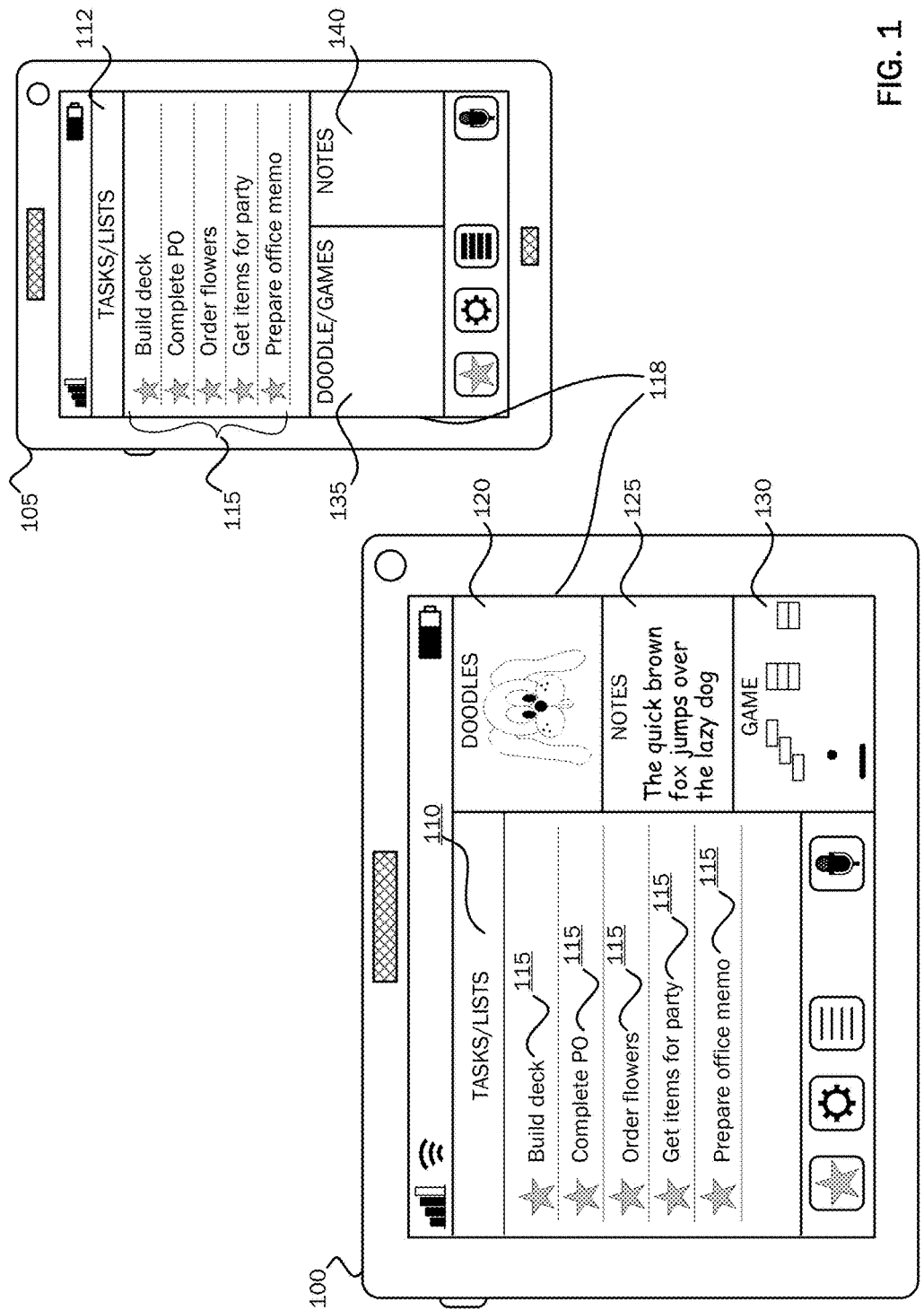
FIG. 1 is a simplified block diagram of two types of computing devices and associated display screens on which tasks/lists may be entered and displayed.

As briefly described above, embodiments of the present invention are directed to providing personalized management of task and list items entered and maintained in association with an electronic task application. A task application user interface may be provided for entering, updating, or otherwise utilizing one or more task or list items as desired by a user of the task application. For example, the task/list item user interface may be utilized for entering a list of items that must be performed by a user in association with a work project. As described below, in accordance with embodiments of the present invention, a "doodling" zone or pane may be deployed in proximity to a task/list interface to allow a user to create sketches or other "doodling" notations, enter notes, or play one or more games that may be deployed in association with the task application, or separate from the task application. In addition, task or list information entered into the task application user interface may be associated with other information, for example, previously stored or accomplished task or list items, for making task or list item entry more efficient, or for enhancing utilization of entered task or list items. In addition, upon the completion of a prescribed number of task or list items, congratulatory feedback may be provided to a user, for example, in the form of one or more useful or enjoyable reward items that may be used as motivation to users in the processing and/or completion of tasks and list items. Description of various types of motivation items and rewards is provided below with respect to FIG. 8.

The following detailed description refers to the accompanying drawings. Wherever possible, the same reference numbers are used in the drawing and the following description to refer to the same or similar elements. While embodiments of the invention may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the invention, but instead, the proper scope of the invention is defined by the appended claims.

FIG. 1 is a simplified block diagram of two types of computing devices and associated display screens on which tasks/lists may be entered and displayed. The computer-generated displays illustrated in FIG. 1 are illustrative of two of a number of different types of displays with which a task/list interface may be displayed and utilized according to embodiments of the present invention. The device 110 is illustrative of a computer-generated display associated with any suitable computing device 100, for example, a conventional personal computer, a laptop computer, a tablet type computer, a slate type computer, and the like. The display 112 is illustrative of a computer-generated display associated with a typical hand held or mobile computing device 105, for example, a mobile telephone. As will be described below with respect to FIGS. 10, 11 and 12, the displays 110 and 112 may operate according to a multitude of different computing devices and systems and according to a variety of stationary, mobile, wired, and wireless computing systems and networks.

According to embodiments of the invention, a task application 200 (described below) may be associated with the displays 110, 112 and may be operative to receive, store and allow editing and manipulation of one or more tasks or list items 115, as illustrated in FIG. 1. As should be appreciated, task or list items may be entered via a task application for display in a task/list interface for allowing the user to track items that must be accomplished for a work, social or play event, to serve as reminders or memory joggers for required events or components of required events, and/or to allow the user to track the progress of one or more aspects of a given work, social, or play event. For example, a user may enter a "to do" list containing various items that must be accomplished for a given work project. For another example, a user may enter a list of items, for example, a grocery list, supply list, parts list, or the like associated with a task or project. As users complete all or a portion of a given task item, they may delete or cross out the task or list item via the task/list interfaces, or the completion or partial completion of a given task or list item may require the entry of additional task or list items or the editing or other amendment to previously entered task or list items. For example, as illustrated in the task/list interfaces 110, 112, a variety of task/list items 115 have been entered by a user for allowing the user to remember required task/list items or to allow the user to track progress or completion of one or more task/list items.

Referring still to FIG. 1, a "doodling" zone or pane 118 is illustrated along the right side of the display 110 and along the bottom edge of the display 112. As should be appreciated, the placement, and orientation of components of the displays illustrated and described herein, including the placement and orientation of the "doodling" zones/panes 118 is for purposes of illustration only and is not limiting of different orientations and placements of the components of the displays 110 and 112, including the displays of the "doodling" zones or panes, as described herein.

The "doodling" zone or pane 118, illustrated with the displays 110/112 includes a "doodling" space 120, a notes space 125 and a game space 130. Referring to the display 112, a "doodling" space/game space 135 is illustrated and a notes space 140 is illustrated. According to embodiments, the "doodling" zone or panes 118 may be utilized for a variety of purposes for assisting a user in the enjoyment of the task application and the associated task/list interfaces. In addition, the "doodling" zone or panes may be utilized for entering helpful information or notes associated with one or more task or list items, or the "doodling" zone or panes may be utilized for launching and playing an enjoyable game or other recreational activity while the user is entering, reviewing, editing, or otherwise utilizing task or list items in the interfaces 110, 112.

As illustrated in FIG. 1, the "doodling" zones may be separated into compartments, for example, the "doodle" space 120, 135 the notes space 125, 140, and the game space 130, 135. As should be appreciated, the compartmentalization of these sections, as illustrated in FIG. 1, is for purposes of example and illustration only. That is, a zone or pane may be included in proximity to the task/list interface that may be used for one or more of the activities, for example, "doodling," notes entry and editing, games playing, and the like. That is, the doodling may take place in the task/list area 110 next to a given task or list item like doodling on a physical to-do list on paper, where the doodling may be associated with specific tasks or span a list of tasks giving them a type of visual signature of the user doing the doodling. For example, a "doodling" item, for example, a sketch of a family pet may be done in the task/list interfaces 110, 112 immediately next to or on top of a previously entered task or list item. For another example, an electronically-enabled handwritten note may be written underneath or adjacent to a previously entered task or list item, as entered and displayed in the task/list interfaces 110, 112. Such user-entered content entered in proximity to one or more task or list items may be operatively associated with the task or list items for providing associative context to the task or list items. For example, a sketch of a family pet next to a task item of "build deck" may provide useful context to the user as to why he/she wants to build a deck.

Likewise, the "doodling" zones or panes may be used for other activities not illustrated in FIG. 1, for example, calculations via an instantiation of a spreadsheet application functionality, voice input, gesture input, electronic pen/ink input, touch screen functionality, for example, touch selectable buttons, controls, applications, display of photographs, avatars, images, and the like. Indeed, the "doodling" zone or panes illustrated in association with the task/list interfaces 100, 112 may be used for a multitude of useful activities that may be performed by a user to assist the user in personalization, utilization, or enjoyment of the task/list entry, review, editing and utilization process.

As may be appreciated, computing system and application users, for example, users of a task/list application and associated interface 110, 112 often become bored, weary, stressed, or otherwise disinterested in activities associated with entering, reviewing, and editing computer-enabled information such as task or list items as illustrated in the interfaces 110, 112. According to embodiments, the "doodling" zone or panes allow for a computer-enabled space or area in proximity to the interfaces 110, 112 in which the user may engage in interesting, stress-relieving, relaxing, or useful activities. For example, the "doodling" space 120, 135 may be provided to allow the user to enter through electronic inking operations, touch operations, keyboard operations, voice entry, gesture entry, or any other suitable means for entering data, one or more relaxing, stress relieving, or otherwise helpful sketches, markings, or the like. For example, if a user is entering a task of "build deck," as illustrated in FIG. 1, the user may enter a hand sketch of a desired deck architecture in the "doodle" space 120, 135. Or, if the user has entered a task of "order flowers," as illustrated in FIG. 1, the user may enter a photograph, avatar, word or phrase in the "doodling" space 120, 135 to associate with the entered task. In addition, if the user has grown weary or otherwise disinterested in the present task of entry, review, or editing of tasks or list items in the interfaces 110, 112, the user may simply sketch an article, for example, an animal, plant, or other object that provides the user a modicum of relaxation or stress relief from the user's current computing activity. The entry of a doodle may also serve as a memory jogger owing to its association to one or more (or no specific) task items. As should be appreciated, while examples described herein may associate a given doodle with a specific task, according to embodiments, there need not be an association of a given doodle to a specific task, and a given doodle may be associated with the application as a whole. That is, a given doodle, or the playing of a given game (as described below) may be associated with any or all the tasks or lists for providing the user a soothing or stimulating distraction while he/she process one, many or all his/her tasks.

In addition to the "doodling" space 120, 135, a notes space 125, 140 may be provided for allowing the user to enter one or more notes, reminders, memory joggers, or other useful entries that may be important to the user relative to a given task or list item or relative to a number of task or list items. For example, for the task item of "order flowers," a user may enter a computer-enabled handwritten note in the notes space 125, 140 of "roses" as a simple reminder to the user that the task item of ordering flowers may be best accomplished by the purchase of roses as the desired flower variety. As should be appreciated, other information may be entered into the notes space, for example, images, photographs, voice-entered information, and the like, to assist the user in accomplishing a given task or for providing context in association with a given task. For example, for the task of "prepare office memo," a user may enter a note of "boss wants this done ASAP" to provide the user with a needed motivation for getting the associated task done immediately. For another example, a contextual note, for example, "memo associated with third quarter sales" may be entered for providing context for the associated task.

According to embodiments, items entered into the "doodling" space 120, 135 or the notes space 125, 140 may be operatively associated with one or more task or list items entered into the interfaces 110, 112, as illustrated in FIG. 1. Such items may be operatively associated with one or more task or list items through manual keyboard entry, for example, by saving an entered "doodling" item or notes item in association with an entered task item, by applying a metadata item, for example, an identification to a "doodling" or notes item in association with a numbered or other identified task or list item, or through voice command, for example, "associate this doodling item with the "build deck" task," wherein natural language processing, as described below, may be used for parsing the spoken or entered commands for properly identifying the desired "doodling" item or notes item with the desired task or list item. In addition, "doodling" items or notes items may be associated with one or more task or list items through touch interaction or mouse interaction, for example, where a task or list item is dragged and dropped onto a "doodling" or notes item, or vice versa. In addition to associating "doodling" items or notes items to one or more task or list items, users may associate moods or feelings with one or more task or list items. For example, a user may categorize one or more task or list items as "boring," "rewarding," "feel good," "happy," "unhappy," and the like.

Once a given "doodling" item or notes item is operatively associated with a given task or list item, the association may be used subsequently as a memory jogger or context provider for the associated task or list item. For example, upon subsequent launching of the task/list interface 110, 112, a "doodling" sketch of a deck architecture may be automatically displayed in association with the displayed task to remind the user of the desired architecture for the desired desk. Likewise, a note previously associated with a given task or list item that has been associated with the task or list item may be displayed in association with the task or list item each time the task or list item is displayed to provide the user context or explanation for the displayed task or list item. In addition, information from one or more software applications or systems may be provided in association with one or more task or list items. For example, location information (e.g., GPS location information) associated with a task or list item may be automatically provided in the pane 118 or in proximity with a given task or list item for serving as information for one or more task or list items or for serving as a memory jogger or other helpful or contextual content. As should be appreciated, "doodling" items and notes items entered, stored and associated with one or more task/list items may be stored locally in the same storage repository as entered and stored task/list items, or may be stored remotely from entered and stored task and list items, as described below with respect to FIGS. 10, 11 and 12.

Referring still to FIG. 1, a games space 130, 135 may be provided in which one or more games may be played by a user to temporarily relax the user from a stressful activity associated with entering, reviewing or editing task or list items. For example, if the user becomes bored, weary, stressed, or distracted while entering, reviewing, or editing task or list items, the user may launch one or more enjoyable or relaxing games in the games space 130 to allow the user a temporary respite from the task/list item entry, review or editing. The playing of a game may also serve as memory jogger when the game is associated with one or more (or no specific) task items. According to embodiments, games provided in the games space 130, 135 may include activities that take a small amount of the user's attention, for example, 10% of the user's attention (similar to doodling activities) for providing the user's brain a soothing focus element or activity, while allowing the user the remaining amount of his/her attention for a given task or list item. For example, a game may be provided for allowing the user to move a finger around the screen as clouds or other objects pass by and providing the user a point for each cloud or other object with which he/she interacts. For example, different cloud types, birds, or other objects may pass by to provide some visual interest, but without requiring much concentration, and without burdening the user with particular levels of winning or losing the game.

According to embodiments, the information entered in or interacted with in the "doodling" zone or pane 118, including the "doodling" space 120, the notes space 125 and/or the game space 130 may be shared with other users. For example, the content or interactions in the zone or pane 118 may be shared across a family network, co-worker network, a friends network, or the like and may be associated with the task list for such groups (e.g., families, co-workers, etc.). Thus, one user may leave a doodle, note or game for others associated with one or more tasks or list items on a given list.

Figure 2:
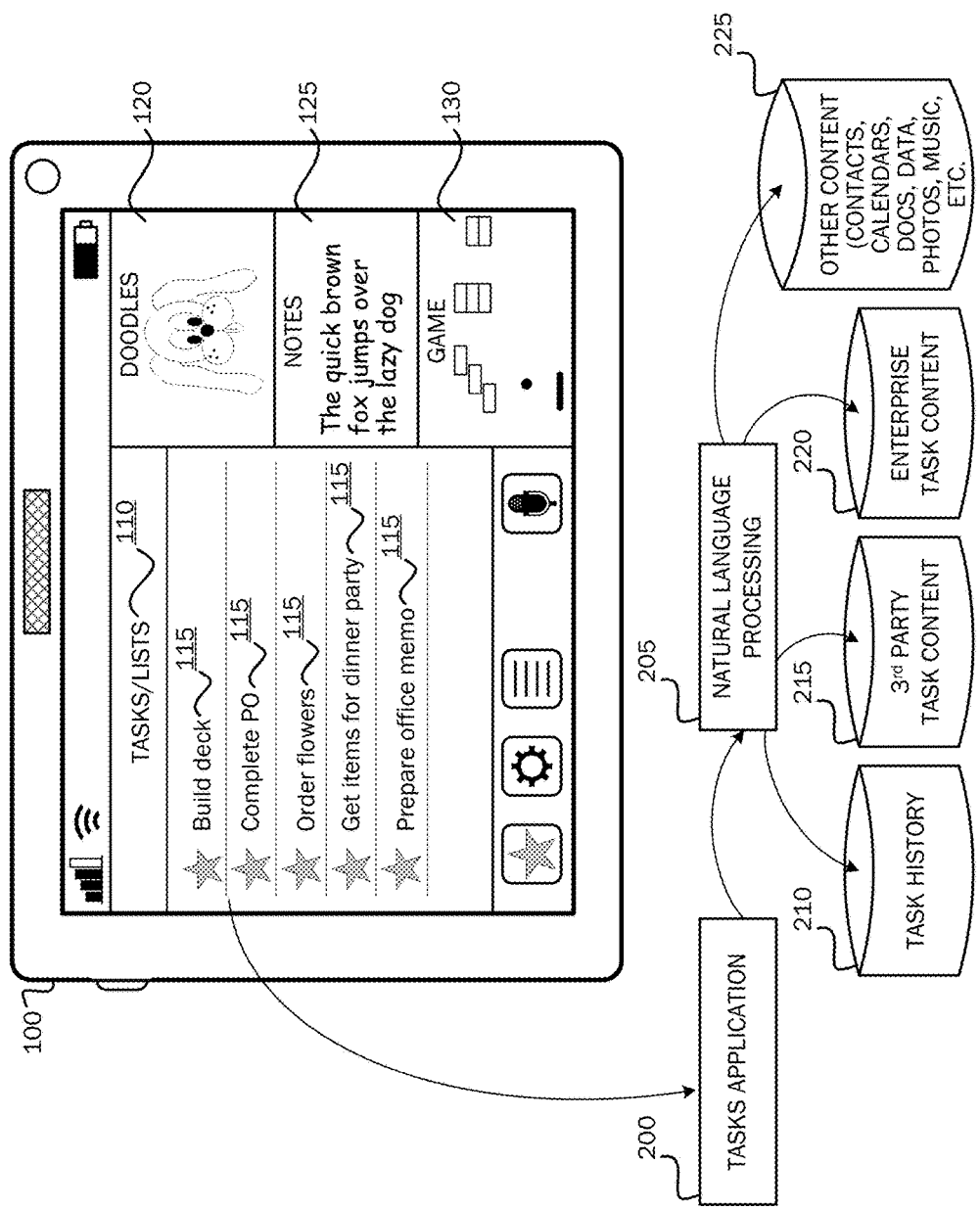
FIG. 2 is a simplified block diagram illustrating a computing device display screen showing a task/list interface, a "doodling" zone or pane and components of a system architecture for associating task/list item information with other associated information.

According to an embodiment of the invention, enhancement and personalization of one or more task or list items may be accomplished by associating task or list items with other information, for example, previously entered list items and/or tasks, third-party task content, enterprise task content, or a variety of other content items, for example, contacts items, calendar items, documents, data, photographs, music, and the like. Referring to FIG. 2, the task application display interface 110 is illustrated in association with a task application 200, a natural language processing application 205 and a variety of information repositories 210, 215, 220, 225.

According to embodiments, when a task or list item 115 is entered, or upon subsequent command, a given task or list item may be processed via natural language processing for associating the task or list item or components of the task or list item with other information that may be utilized for enhancing or otherwise personalizing the task or list item. According to embodiments, the tasks application 200 may be operable for allowing entry, update, and/or utilization of one or more task or list items. For example, the task/list item user interface may be utilized for entering a list of items that must be performed by a user in association with a work project. According to one embodiment, the task application 200 is further operable to receive a task or list item 115 upon entry or to receive a task or list item 115 upon selection or command by a user for passing the received or selected task or list item to a natural language processing application 205 for associating the task or list item or components of the task or list item with other information.

According to embodiments, a text string associated with a given task or list item may be passed through a natural language processing application for breaking the text string into components and associated metadata items that may be used for associating the text string with other information. A text processing application may be employed by the natural language processing application whereby the text string is broken into one or more text components for determining whether the received/retrieved text may contain terms that may be used to find information that may be associated with a given task or list item. Breaking the text into the one or more text components may include breaking the text into individual sentences followed by breaking the individual sentences into individual tokens, for example, words, numeric strings, etc.

Such text processing is well known to those skilled in the art and may include breaking text portions into individual components according to known parameters. For example, punctuation marks and capitalization contained in a text portion may be utilized for determining the beginning and ending of a sentence. Spaces contained between portions of text may be utilized for determining breaks between individual tokens, for example, individual words, contained in individual sentences. Alphanumeric strings following known patterns, for example, five digit numbers associated with zip codes, may be utilized for identifying portions of text. In addition, initially identified text components may be passed to one or more recognizer programs for comparing initially identified text components against databases of known text components for further determining individual components extracted from a given task or list item. For example, a word contained in a given sentence may be passed to a database to determine whether the word is a person's name, the name of a city, the name of a company, or whether a particular word is a recognized acronym, trade name, or the like. As should be appreciated, a variety of means may be employed for comparing text components against known, words, or other alphanumeric strings for further identifying those text items.

Once a given task or list item, for example, the task item of "build deck" illustrated in the interface 110, is passed through the natural language processing application 205, as described above, the subject task or list item or components of the task or list item as separated by the natural language processing application 205 may be used for comparing against information and/or data contained in a variety of local or remote information repositories for gathering other information that may be used for personalizing or enhancing the subject task or list item. For example, the task or list item or components of the task or list item may be passed to and compared against information contained in a task history repository 210 which may include task information previously entered and/or accomplished by the present user or by other users associated with the present user. For example, a task history repository 210 may contain a list of task or list items previously entered and/or accomplished by the user that may have information relevant to or otherwise helpful in association with the subject task or list item. For example, if the user had a previous task associated with the building of some structure, for example, "build sun room," then task or list items stored for that example previous task may be relevant to or otherwise associated with a current task or list item, such as the example task of "build deck" illustrated in FIG. 2. Such previous or other task or list information may be obtained by or provided to the user from another user. For example, a previous task performed or entered by another user associated with the building of a structure may be passed to the user needing such task or list items via the tasks application 200, or via electronic mail, private or public collaborative networks and/or one or more social networks. As described and illustrated below with respect to FIG. 3, such information may be presented to the user, and the user may utilize some or all of the obtained information for personalizing or otherwise enhancing the current task or list item.

Similarly, the task or list item, or components of the task or list item may be passed to a third-party task content repository 215 through a distributed computing network, for example, through the Internet, to obtain helpful information that may be used for personalizing or otherwise enhancing the subject task. For example, if the subject task 115 of "order flowers" is processed via the natural language processing application, the subject task or components of the subject task, for example, "order" and "flowers" may be passed to a third-party flower provider Internet-based Web site, and information associated with ordering flowers, for example, Web site addresses, telephone numbers, order forms, and the like may be offered to the user for association with the subject task item, as described below with reference to FIGS. 3 and 4. According to an embodiment, the user may be provided a reminder of such task or list items from such a Web site in the future, even if the information is not associated with an active task. For example, a user may no longer have an active task for "building a deck," but information associated with that task may be interesting to the user in the future. Similarly, task content information may be obtained from an enterprise repository 220, for example, the user's employer, school, or other organization for use in personalizing and/or enhancing a given task or list item.

Other content items, such as the content items displayed with reference to the repository 225 may likewise be obtained and associated with a given task item. For example, other content such as contact items, calendar entries, documents, other data, photographs, or music may be obtained and associated with a given task or list item for personalizing or enhancing the task or list item. For example, for the task of "prepare office memo," a document showing a previous office memo prepared by the user or by another user accessible by the present user may be obtained, and a link to the obtained document may be entered into the task interface 110 in association with the subject task to enhance the user's use of the subject task. Similarly, a photograph or music file may be associated with a given task or list item to personalize the task or list item or to serve as a memory jogger or enjoyment item in association with the task or list item. As should be appreciated, a vast multitude of content may be obtained and may be operatively associated with a given task or list item, for example, the entry of a link to the content, or such content may be automatically entered directly into the task/list interface 110 in proximity with the subject task or list item.

Figure 3:
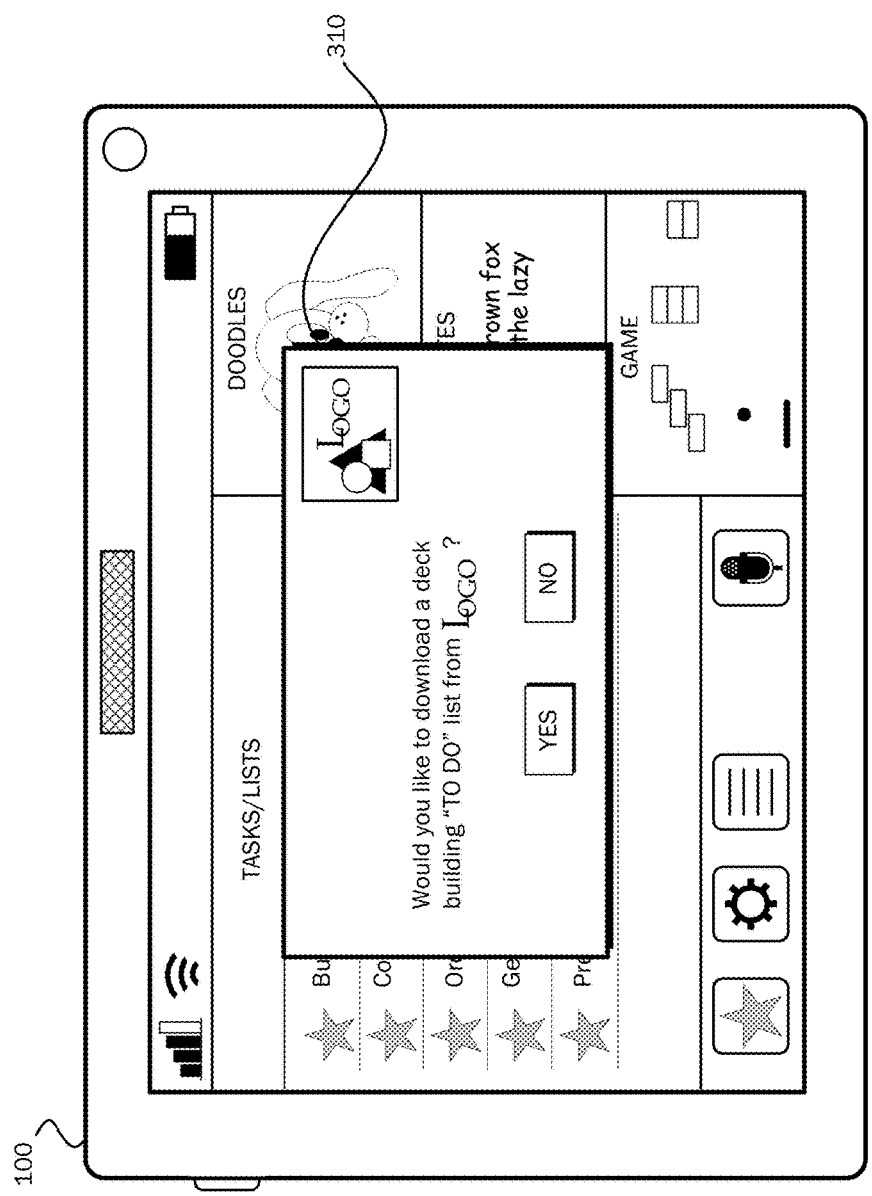
FIG. 3 is a simplified block diagram of two types of computing devices and associated display screens on which tasks/lists may be entered and displayed.

Referring then to FIG. 3, according to one embodiment, after a given content item is obtained from a local or remote content repository 210, 215, 220, 225, a user interface component 310 may be presented to the user to offer the inclusion of the obtained content into the task/list interface in proximity to the subject task or list item or to offer association of the content with the subject task or list item. Consider for example that the task item of "build deck" illustrated in FIGS. 2 and 3 is processed via the natural language processing application 205 and the task item or components of the task item are passed to a third-party task content repository, for example, a popular "Do-It-Yourself" store that has supplies, materials and assistance in building structures, for example, decks. Consider further for example, that a Website operated by the store includes informational instructions, for example, "to do" lists in association with building various structures like decks. After the subject task items or components of the subject task items as processed through the natural language processing application 205 are passed to the Website of the third-party store, an instruction list, "to do" list, supply list, or the like may be obtained from the third-party content provider, and the information may be provided to the user as a personalization or enhancement to the presently entered task of "build deck." In addition to content such as an instruction list, "to do" list, or supply list, other offerings and/or information may be provided, for example, sales offers, store operating hours, store locations, and the like may be provided in association with one or more task or list items.

As illustrated in FIG. 3, a dialog box 310 is illustrated in response to locating such information and a question of "Would you like to download a deck building "to do" list from Logo?" is provided in the dialog box. As should be appreciated, third-party providers of such content may offer access to their content via the task application 200 as a mechanism of advertising their services, products, or other offerings, and a logo or other identifying information for the third-party provider may be provided in the dialog box 310, as illustrated in FIG. 3. The dialog box 310 may be utilized for offering any manner of content obtained for a given task or list item, as described above with reference to FIG. 2, including previously entered tasks, enterprise task content, or other content illustrated in the content repository 225. As should be appreciated, the dialog box 310 is for purposes of example only and in not limiting of other types of user interface components that may be used for allowing user interaction as described herein.

Figure 4:
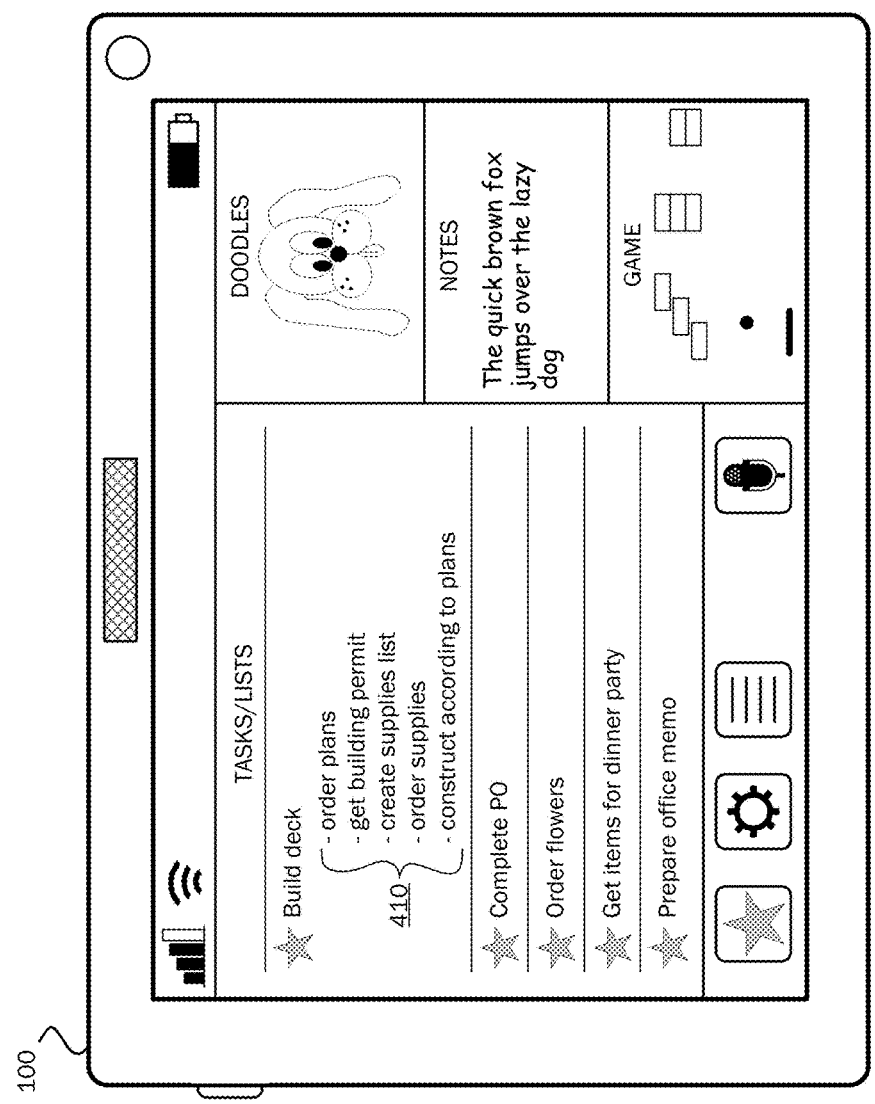
FIG. 4 is a simplified block diagram of two types of computing devices and associated display screens on which tasks/lists may be entered and displayed.

If the user accepts the download of obtained information, or accepts association of obtained information with the subject task or list item, the obtained information may be operatively associated with the subject task or list item, or may be entered directly into the task/list interface 110 in association with the subject task or list item. Referring to FIG. 4, the example content of a deck building "to do" list 410 obtained from the example third-party store has been downloaded and displayed directly underneath the subject task of "build deck." For example, "to do" items of "order plans," "get building permit," and the like have been obtained from the third-party content provider and have been entered directly under the subject task of "build deck" for personalizing and/or enhancing the subject task item. As should be appreciated, a variety of useful user interface functionality may be utilized, for example, collapsing the downloaded and displayed list under the task item of "build deck" to remove information clutter. Similarly, such a collapsed item may be subsequently expanded underneath the subject task item of "build deck" to display the list of content items downloaded from the third-party content provider.

Figure 5:
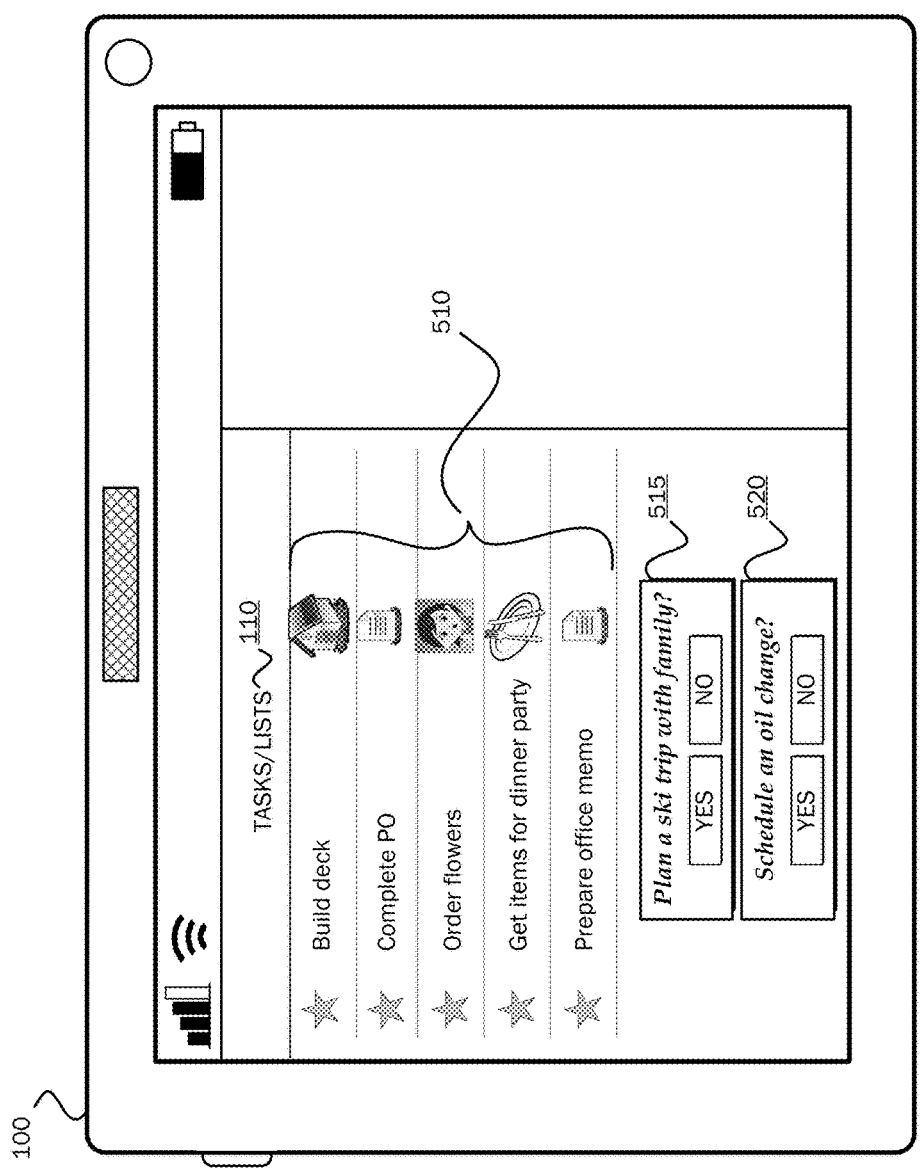
FIG. 5 is a simplified block diagram of two types of computing devices and associated display screens on which tasks/lists may be entered and displayed.

Referring now to FIG. 5, additional information for personalizing and/or enhancing use of one or more task or list items are illustrated. For example, a variety of images, notes, icons, "stickers," and the like 510 may be provided adjacent to or in proximity with one or more task or list items for enhancing use of or review of associated task or list items. For example, an icon, image, or photograph, such as a photograph of the user's home, may be associated with and displayed next to a task item such as "build deck." An icon for or link to a document or other identification for a document may be displayed or associated with an item such as the item "complete purchase order." For the task item of "order flowers," a content item such as a photograph of the recipient of the flowers, an avatar, or other identifying icon, such as an image of a bouquet of flowers, may be displayed adjacent to the example task or list item, and so on. As will be described below with reference to FIG. 8, such images, icons or other content may be animated, or otherwise manipulated as memory joggers or reward notations, to cause a user to process and/or accomplish a task or to reward a user upon the completion of a task.

According to one embodiment, such images, notes, icons, and "stickers" may be auto-inferred and applied to task or list items based on metadata associated with task or list items. For example, if a given task calls out a particular person, an avatar or photo associated with the person may be retrieved and may be displayed in proximity to the given task. For another example, if the given task identifies a particular activity, such as a birthday, then a "birthday" icon or sticker may be displayed next to the given task. As should be appreciated, these are but a few examples of the many types of images that may be automatically associated with a task or list item based on information inferred from the task or list item.

Referring still to FIG. 5, a variety of other information may be automatically provided in the task interface 110 for personalizing or enhancing a given task or list item, or for offering to the user one or more potential task or list items that the user may desire for entry and display in the task interface 110. Such proposed or offered task or list items may be proposed or offered in association with or in response to a variety of variables, for example, date, time, temperature, season, month, holiday indication, and the like. For example, potential task or list items that are often performed by users on certain holidays, for example, task or list items associated with purchasing gifts, potential task or list items associated with certain dates, times, and seasons, and the like may be offered to a user for automatic entry and display in the task interface 110 as those triggering variables are reached or encountered.

For example, at a prescribed time before a given holiday, for example, a holiday on which gifts are often exchanged, a proposed task item of "purchase gift for friend" may be offered to a user for entry into the task interface 110. Similarly, a task or list item associated with a particular season may be offered to the user at the commencement of that season. For example, referring to FIG. 5, the task application 200 may review previous tasks or calendar items entered for the user and may determine that the user typically plans a ski trip during a certain month. At a prescribed time, for example, six weeks before the commencement of that month, a proposed task item 515 of "plan a ski trip with family?" may be proposed to the user, as illustrated in FIG. 5. If the user accepts the proposed task item, then the proposed task item may be automatically entered into the task interface 110. Similarly, if the user's calendar entries or previous task entries indicate that the user changes the oil in his/her automobile every three months, but a review of the user's present task list shows that the user has no task item for changing his/her oil in the upcoming three months, the task application 200 may propose a task item 520 of "change oil?". If the user accepts the proposed task item, then the proposed task item may be entered automatically.

Figure 6:
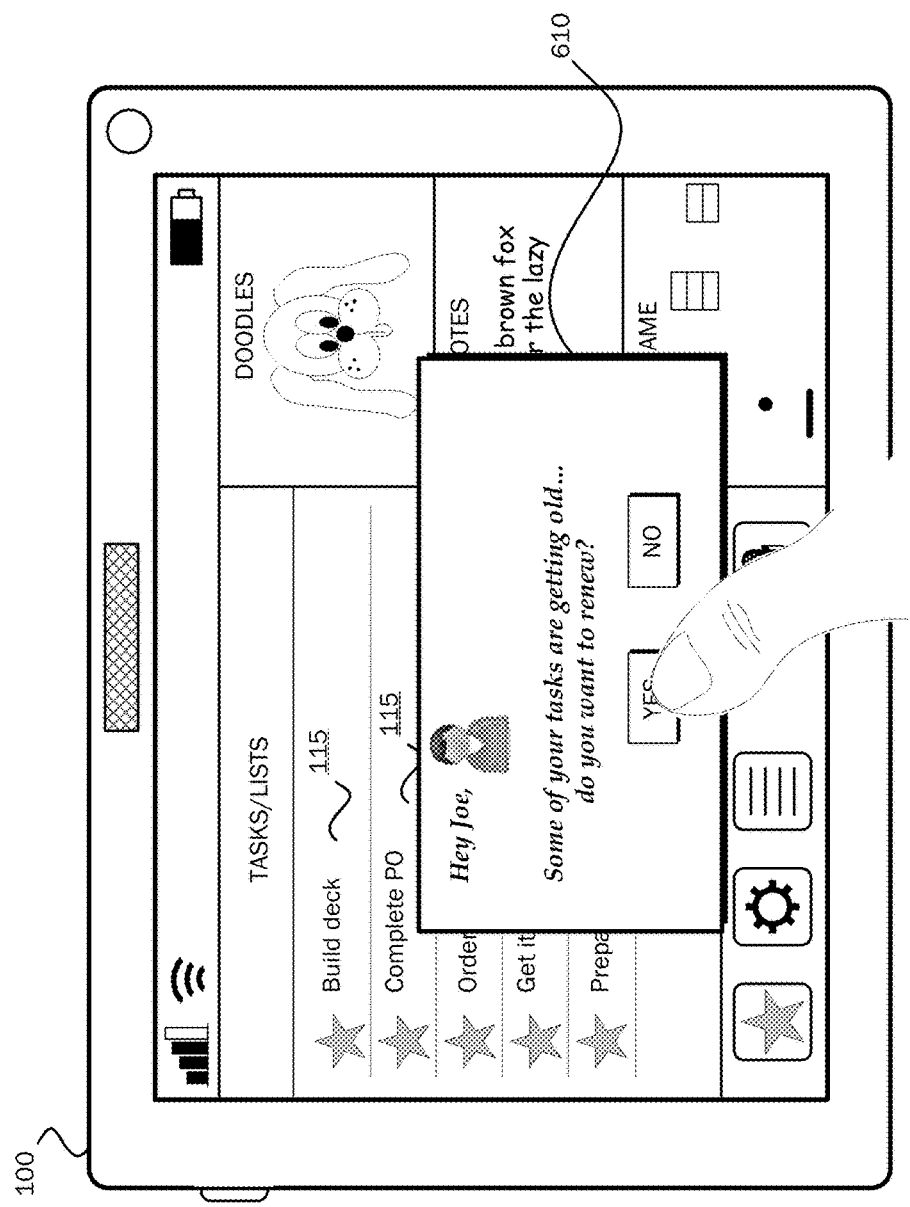
FIG. 6 is a simplified block diagram of two types of computing devices and associated display screens on which tasks/lists may be entered and displayed.

Referring to FIG. 6, according to an embodiment, the task application 200 may periodically review task and list items previously entered into the task interface 110 to determine the age and progress associated with one or more task or list items. According to embodiments, the task or list items may be presented to the user in an order based on timings or age. For example, the task or list items may be presented with oldest items at the top, or the task or list items may be presented to the user based on certain timings, such as all items associated with calendar entries of this week first, all items associated with calendar entries of next week second, and so on. As should be appreciated, a number of aging or timing attributes may be used for ordering task or list items, as described herein. For example, all items more than one month old may be collapsed into a single task or list item such as "task or list items older than one month," or all items that are associated with a particular holiday may be collapsed into a single task or list item displayed relative to other task or list items based on the timing of the associated holiday.

Figure 7:
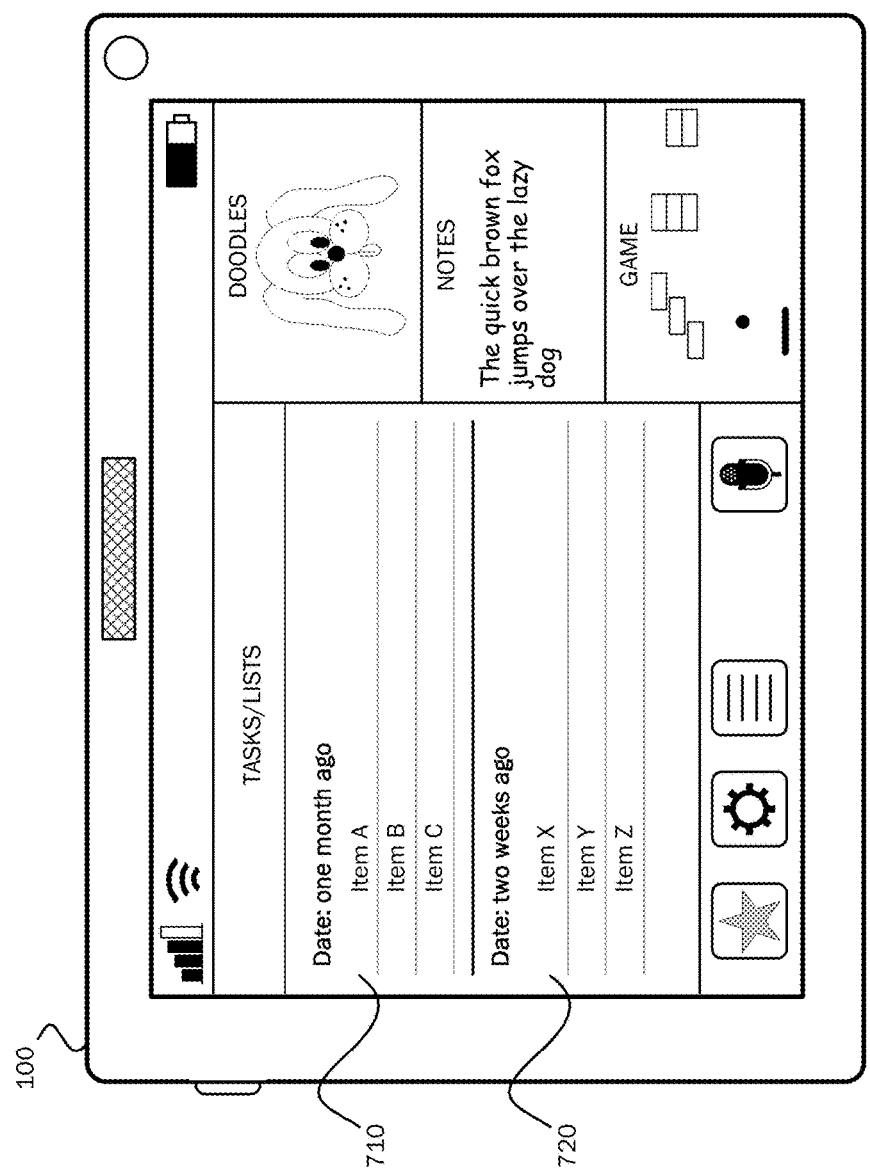
FIG. 7 is a simplified block diagram of two types of computing devices and associated display screens on which tasks/lists may be entered and displayed.

In order to enhance the user's utilization of the task application and its associated functionality, a dialog box or other suitable user interface component 610 may be presented to the user to remind the user that some of his/her task or list items are becoming outdated and/or have not been accomplished. In addition, the user may be offered an opportunity to review old, outdated or unaccomplished tasks. If the user accepts the offer to review those tasks or list items, aged task or list items may be presented to the user, as illustrated in FIG. 7, to allow the user to edit, delete, maintain, or otherwise process the aged tasks. For example, as described above, aged task or list items may be presented to the user in categories, for example, task items older than one month 710, task items older than two weeks 720, and the like.

According to other embodiments, the task application 200 may be operative to pick (from time-to-time) task or list items that are past a prescribed age (e.g., one month) and to show the picked task or list items to the user to remind the user of the need to process the aging task or list items. For example, a question may be presented to the user, such as "Do you want to work on the task of "build a deck" entered more than a month ago? If not, do you want to delete or modify the task?" Based on the user's response, the application 200 may process the task or list item accordingly. In addition, users may create rules for causing or allowing the task application 200 to automatically delete task or list items are more than a prescribed age. Similarly, rules may be created to prompt a user to pick a certain date in the future for moving or associating with a task or list item.

Figure 8:
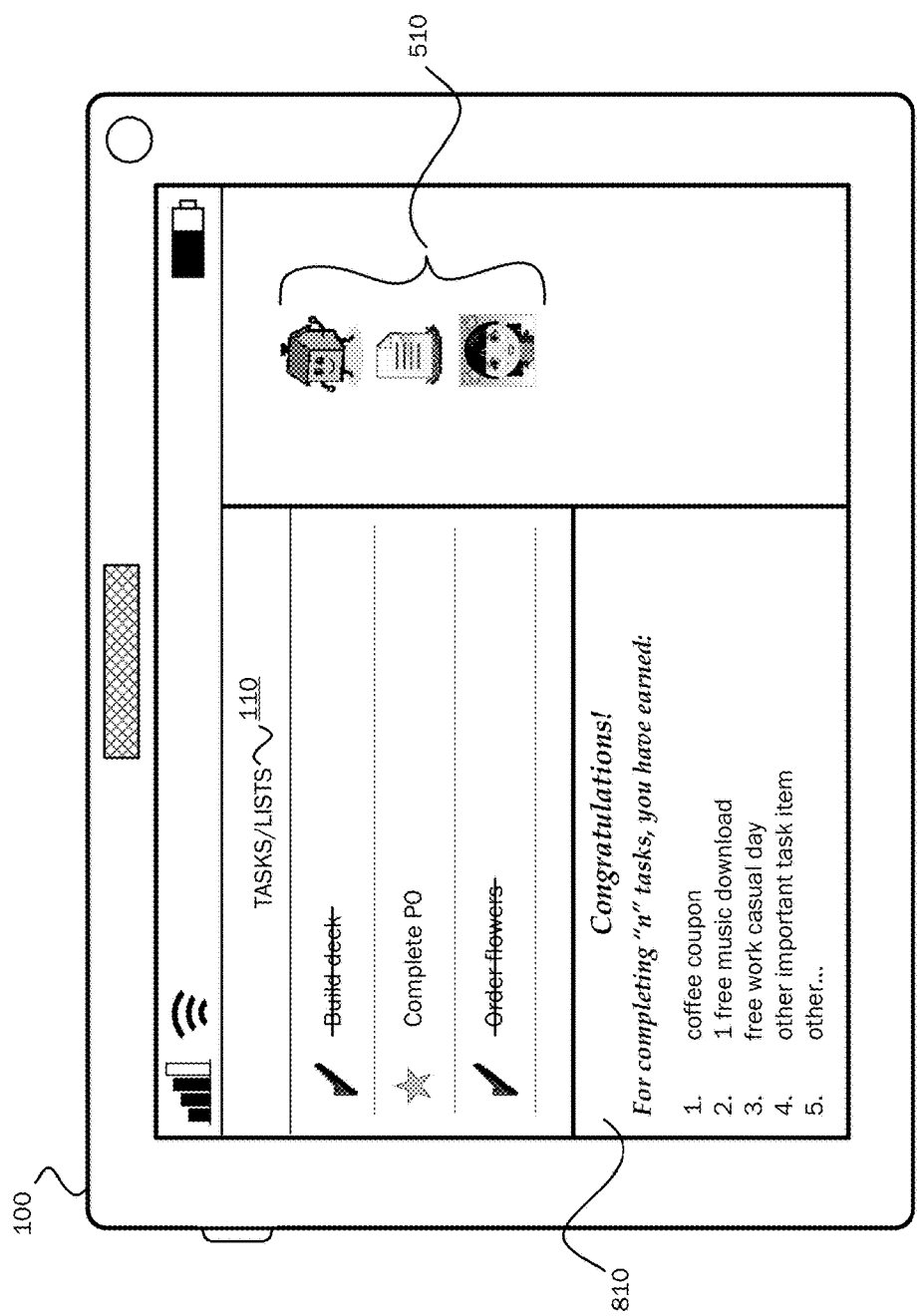
FIG. 8 is a simplified block diagram of two types of computing devices and associated display screens on which tasks/lists may be entered and displayed.

According to embodiments, in order to personalize and enhance use of the task application 200 and the associated functionality of the task application described herein, a rewards system may be employed for providing positive feedback or other types of rewards to a user upon the successful completion of one or more tasks or list items. Referring to FIG. 8, when a given task item, for example, the task item "build deck" is accomplished, a strikethrough of the listed task or list item may be accomplished by any suitable input mechanism, for example, touch, electronic pen, keyboard, mouse drag, voice activation, gesture, and the like. Once an indication is provided to the task application 200 that a given task or list item has been accomplished or otherwise disposed of, a variety of feedback mechanisms may be provided for indicating the successful completion or disposal of the subject task or list item. For example, an icon such as a star icon disposed adjacent to a given task item may be changed to a different type of icon such as a check-mark icon for providing an approving feedback to the user.

In addition, images, photographs, music, or other content may be provided in association with a state change associated with a given task. For example, if a task is accomplished or is past due, or is otherwise disposed of, a visual image 510 such as an image, icon, "sticker," photograph, or other content item may be provided and may be changed (e.g., happy face icon to frowning face icon) when a task is accomplished or when a task becomes past due. For example, upon the completion of a task such as "build deck," an image of a house or other structure may be provided next to the accomplished task or list item, and the image may be provided via an animation wherein the image dances, vibrates, changes color, or the like to provide a positive, friendly, humorous, or otherwise enjoyable feedback in association with the user marking the associated task or list item as complete or disposed of. For another example, an avatar associated with a task such as "order flowers" may change from a frowning face to a smiley face, or the avatar may wave at the user, or otherwise be presented in a manner that is pleasing to the user and that provides positive feedback to the user for his/her completion of the task or list item. Other visual rewards may include enhancing or changing visual feedback as more tasks or list items are completed, for example, as more and more tasks are completed, providing more colorful or otherwise more stimulating visual feedback (e.g., 2 stars instead of 1 star after the completion of 5 items). As should be appreciated, these are but a couple of examples of a multitude of information that may be presented to a user to positively reinforce and reward the user for completion or disposal of a task and list items.

In addition to such visual rewards, other types of congratulatory rewards may be offered to a user upon the completion of one or more task or list items. As illustrated in FIG. 8, a variety of congratulatory rewards 810 may be provided to the user upon the completion of one or more task items. For example, if the user completes all tasks associated with the building of a deck, as described above by way of example with reference to FIGS. 1 through 5, a coupon may be automatically transmitted to the user from a third-party vendor, for example, a supplier of building materials, that may be used by the user for receiving a discount, free item, or other complimentary material or information as a reward for the user completing the associated task. For example, when the user purchases materials from the example vendor, the user may sign up for an association with the vendor through the vendor's Website, and the user's completion of activities associated with the example building project may be transmitted to the vendor when the user marks the example task item as complete. The vendor may participate in such a rewards program as a method of generating customer satisfaction, customer allegiance, and the like.

Similarly, the user's employer may establish relationships with one or more vendors for providing useful rewards upon the completion of tasks. For example, a coupon for a free cup of coffee from a popular coffee vendor may be provided to users by employers when a prescribed number of tasks are marked as complete by employees. Similarly, a free music download may be provided by the user's employer, or by third-party vendors, or the like. Other rewards might include free casual days at work, and the like.

In addition, rewards may be provided in the form of information about the completion of task or list items being passed to other users. For example, enterprise-based or third party rewards may be provided, such as recognition via public badges, commendations, compliments and bragging comments for task completion on enterprise intranets and/or electronic social gathering points or on public Internet-based web pages and/or social gathering points such as FACE-BOOK sites/pages, and the like. For example, users may be able to publish their task accomplishments via social networks like FACEBOOK, and if tasks are related to their work, users may publish accomplishments via work-oriented information sites to alert others as to their skill sets (including organizational skills in completing tasks). Other users who may have been involved in the completion of a particular task may then comment on a completed task published by a given user and the process of task completion will have been enhanced.

A number of other types of motivation or rewards may be provided or associated with task or list item completion. For example, "getting started experiences" may be provided such as games for which different aspects or functionalities within the task application are slowly exposed as a user completes additional task or list items. For another example, an initial task list may be populated with tasks to help the user learn a product (e.g., a task that says "Cross this task out" or "Add birthday reminders"). For another example, templates/themes associated with task or list items equivalent to paper task lists with pictures on them, but generated automatically based on the content of tasks or lists, may be provided to a user.

Other rewards may be provided in the form of substantive information that may be provided to the user. For example, upon the completion of a prescribed number of tasks, the task application 200 may automatically rearrange, annotate, highlight, etc. task or list items that have not been accomplished and may present those task or list items to the user in the task interface 110 in a manner that shows the user a quick assessment of how the user is doing with respect to his/her task/list items. For example, remaining task items may be presented in the task interface, and a dialog box or bubble may be popped up on the display to indicate to the user that he/she has completed 25% of his/her current task or list items, and that the user is averaging a completion rate of a certain percentage of his/her task or list items on a weekly basis.

Still other rewards may be provided in the form of enhanced or more advanced use of the tasks application 200. For example, after the completion of ten task items, the user may be provided more functionality of the tasks application 200 where previously "locked" features of the application are "unlocked" along with information provided to the user as to the now available features and how to use those features. For example, a user may be locked from creating a task list with more than twenty items until the user completes a prescribed number of task or list items. For another example, some rewards may not be available until the user completes a prescribed number of tasks within a prescribed time period.

Such information and rewards automatically provided by the task application 200 may provide the user with a modicum of relief, stress reduction, or satisfaction in association with the accomplishment of the prescribed number of task or list items. As should be appreciated, the foregoing rewards or congratulatory offerings are but a few examples of the vast number of rewards or offerings that may be presented to a user upon the completion of one or more task items as a method of rewarding the user and as a method for enhancing the personalization and utilization of the task application 200 and its associated functionality.

Figure 9:
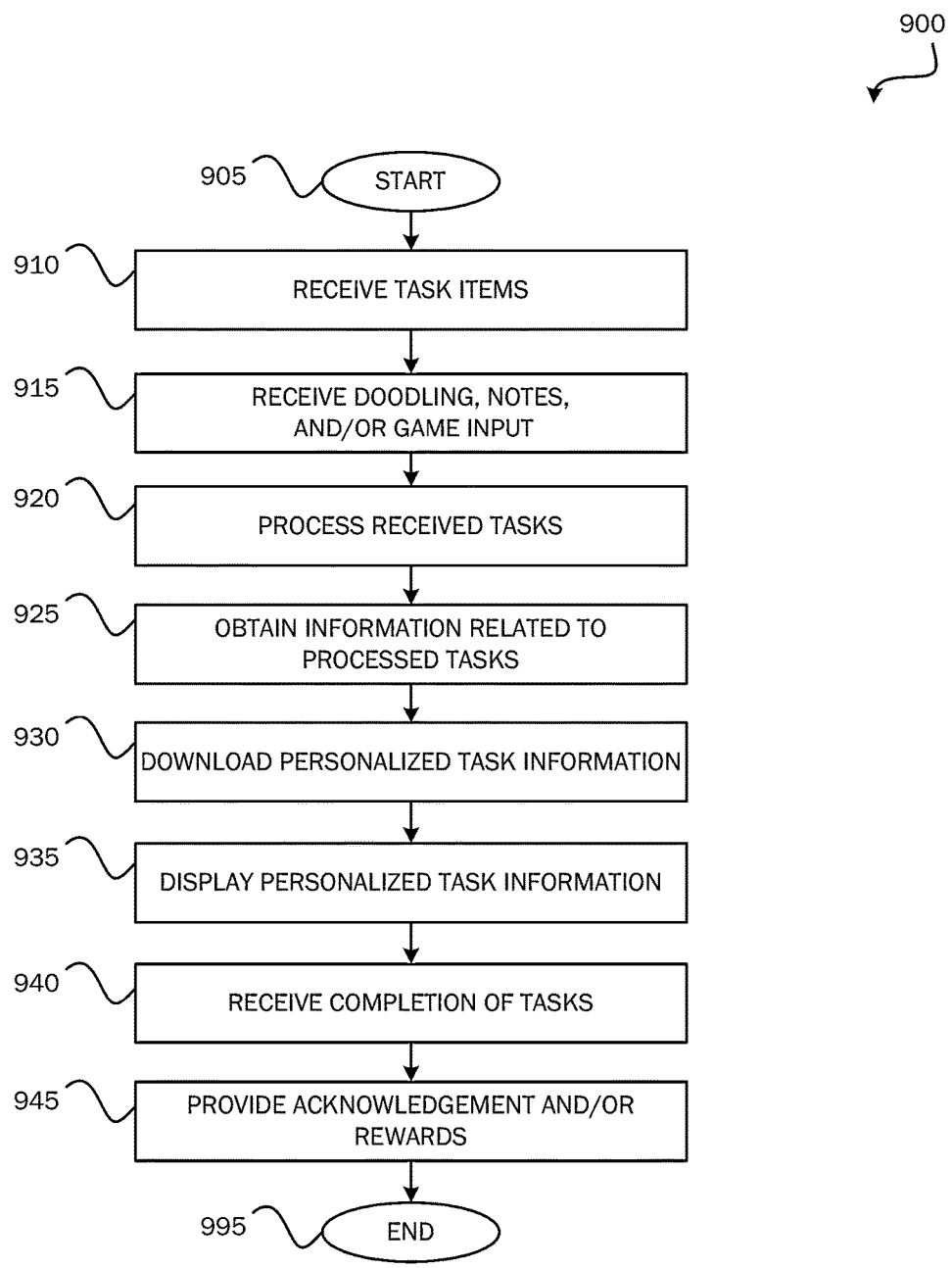
FIG. 9 is a flowchart illustrating a method for personalization and use of task and list items.

Having described example user interface components, example content and example architectures in which embodiments may operate, FIG. 9 is a flowchart illustrating a method for personalization and use of task and list items. The routine 900 begins at start operation 905 and proceeds to operation 910 where the task application 200 receives one or more task or list items, as described above. As should be appreciated, task and/or list items may be received according to a variety of acceptable and suitable input means, for example, keyboard/mouse entry, touch entry, voice entry, gesture entry, electronic pen entry, and the like. At operation 915, any "doodling," notes and/or gaming input may be received by the task application 200 as described above with reference to FIG. 1.

At operation 920, received or selected tasks may be processed by the task application 200 via the natural language processing application 205, and at operation 925, information related to processed tasks may be obtained from a variety of task content repositories, as described above with reference to FIG. 2. At operation 930, if desired by the user, obtained information may be downloaded and associated with one or more task or list items, and/or, at operation 935, the information may be downloaded directly into the task interface 110 and displayed in association with one or more task or list items. For example, as described above, a "to do" list obtained from a third-party vendor may be downloaded directly into the user's task interface 110 and displayed underneath an associated task or list item.

At operation 940, completion of one or more task or list items may be indicated by the user, as described above. At operation 945, acknowledgement and/or a variety of rewards or feedback may be provided to the user in association with one or more completed task or list items, as described above with reference to FIG. 8. If a prescribed amount of time passes (e.g., one week, one month, etc.) without the completion of one or more task or list items as indicated at operation 940, operation 945 may include an encouragement or reminder to the user to complete one or more task or list items instead of the presentation of acknowledgements and/or rewards. The routine 900 ends at operation 995.

Figure 10:
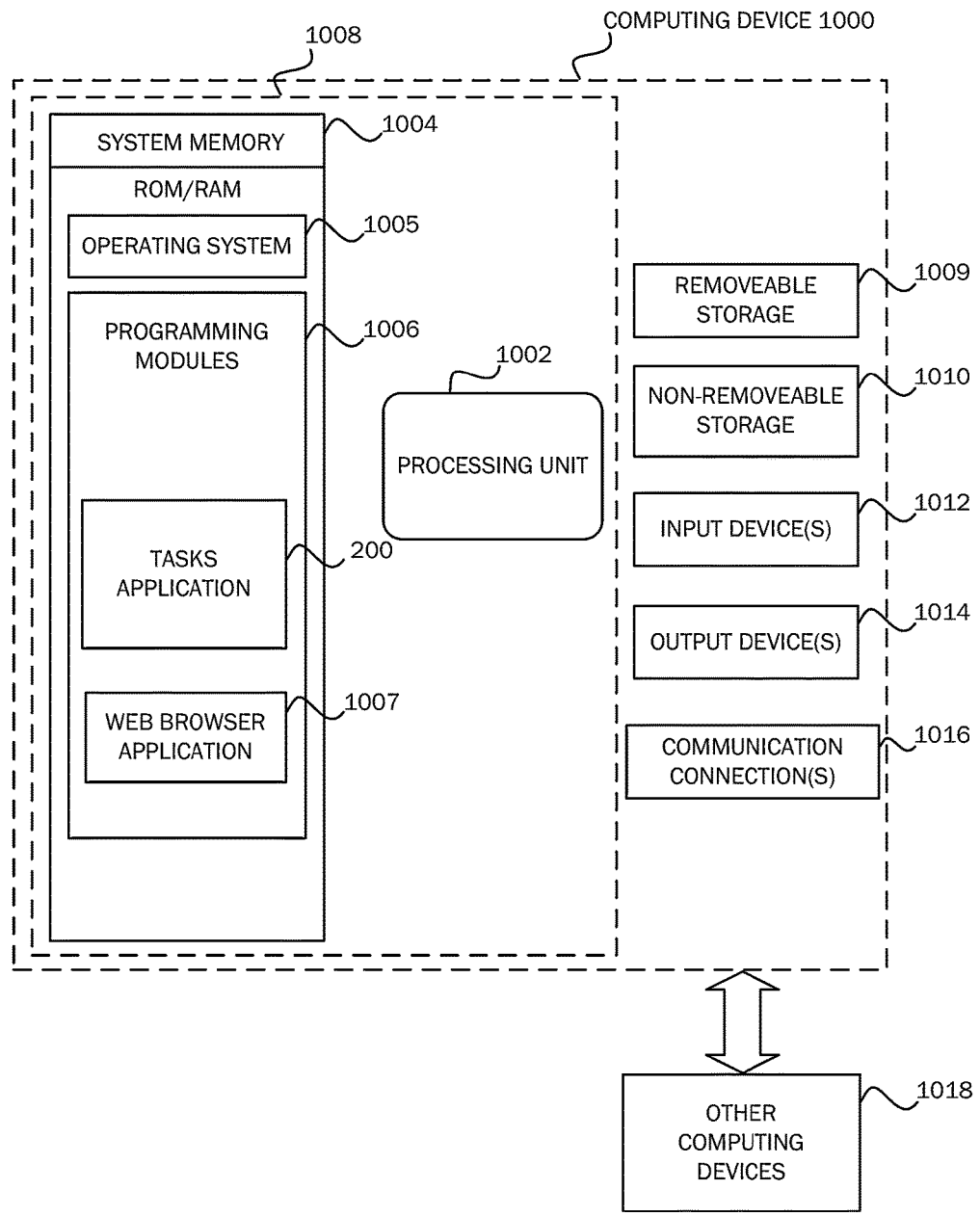
FIG. 10 is a simplified block diagram of a computing device with which embodiments of the present invention may be practiced.

The embodiments and functionalities described herein may operate via a multitude of computing systems, including wired and wireless computing systems, mobile computing systems (e.g., mobile telephones, tablet or slate type computers, laptop computers, etc.). In addition, the embodiments and functionalities described herein may operate over distributed systems, where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like. FIGS. 10-12 and the associated descriptions provide a discussion of a variety of operating environments in which embodiments of the invention may be practiced. However, the devices and systems illustrated and discussed with respect to FIGS. 10-12 are for purposes of example and illustration and are not limiting of a vast number of computing device configurations that may be utilized for practicing embodiments of the invention, described herein.

FIG. 10 is a block diagram illustrating example physical components of a computing device 1000 with which embodiments of the invention may be practiced. The computing device components described below may be suitable for the computing devices described above, for example, the computing devices 100, 105 and server and database systems. In a basic configuration, computing device 1000 may include at least one processing unit 1002 and a system memory 1004. Depending on the configuration and type of computing device, system memory 1004 may comprise, but is not limited to, volatile (e.g. random access memory (RAM)), non-volatile (e.g. read-only memory (ROM)), flash memory, or any combination. System memory 1004 may include operating system 1005, one or more programming modules 1006, and may include a web browser application 1007. Operating system 1005, for example, may be suitable for controlling computing device 1000's operation. In one embodiment, programming modules 1006 may include a logging engine 1020 embedded in a web page and/or installed on computing device 1000. Furthermore, embodiments of the invention may be practiced in conjunction with a graphics library, other operating systems, or any other application program and is not limited to any particular application or system. This basic configuration is illustrated in FIG. 10 by those components within a dashed line 1008.

Computing device 1000 may have additional features or functionality. For example, computing device 1000 may also include additional data storage devices (removable and/or non-removable) such as, for example, magnetic disks, optical disks, or tape. Such additional storage is illustrated in FIG. 10 by a removable storage 1009 and a non-removable storage 1010.

As stated above, a number of program modules and data files may be stored in system memory 1004, including operating system 1005. While executing on processing unit 1002, programming modules 1006, such as the tasks application 200, may perform processes including, for example, one or more method 900's stages as described above. The aforementioned process is an example, and processing unit 1002 may perform other processes. Other programming modules that may be used in accordance with embodiments of the present invention may include electronic mail and contacts applications, word processing applications, spreadsheet applications, database applications, slide presentation applications, drawing or computer-aided application programs, etc.

Generally, consistent with embodiments of the invention, program modules may include routines, programs, components, data structures, and other types of structures that may perform particular tasks or that may implement particular abstract data types. Moreover, embodiments of the invention may be practiced with other computer system configurations, including hand-held devices, multiprocessor systems, microprocessor-based or programmable consumer electronics, minicomputers, mainframe computers, and the like. Embodiments of the invention may also be practiced in distributed computing environments where tasks are performed by remote processing devices that are linked through a communications network. In a distributed computing environment, program modules may be located in both local and remote memory storage devices.

Furthermore, embodiments of the invention may be practiced in an electrical circuit comprising discrete electronic elements, packaged or integrated electronic chips containing logic gates, a circuit utilizing a microprocessor, or on a single chip containing electronic elements or microprocessors. For example, embodiments of the invention may be practiced via a system-on-a-chip (SOC) where each or many of the components illustrated in FIG. 10 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the tasks application 200 and/or the web browser application 1007 may operate via application-specific logic integrated with other components of the computing device/system 1000 on the single integrated circuit (chip). Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

Embodiments of the invention, for example, may be implemented as a computer process (method), a computing system, or as an article of manufacture, such as a computer program product or computer readable media. The computer program product may be a computer storage media readable by a computer system and encoding a computer program of instructions for executing a computer process.

The term computer readable media as used herein may include computer storage media. Computer storage media may include volatile and nonvolatile, removable and non-removable media implemented in any method or technology for storage of information, such as computer readable instructions, data structures, program modules, or other data. System memory 1004, removable storage 1009, and non-removable storage 1010 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 1000. Any such computer storage media may be part of device 1000. Computing device 1000 may also have input device(s) 1012 such as a keyboard, a mouse, a pen, a sound input device, a touch input device, etc. Output device(s) 1014 such as a display, speakers, a printer, etc. may also be included. The aforementioned devices are examples and others may be used.

The term computer readable media as used herein may also include communication media. Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 11A:
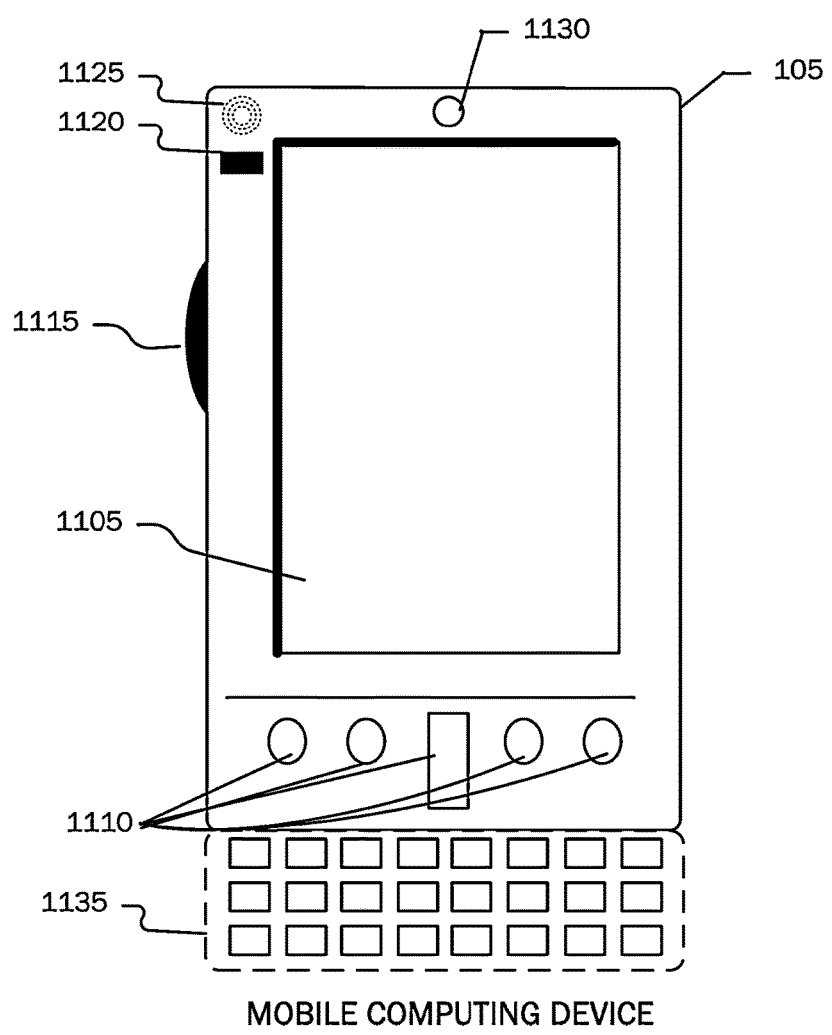
FIGS. 11A and 11B are simplified block diagrams of a mobile computing device with which embodiments of the present invention may be practiced.
Figure 11B:
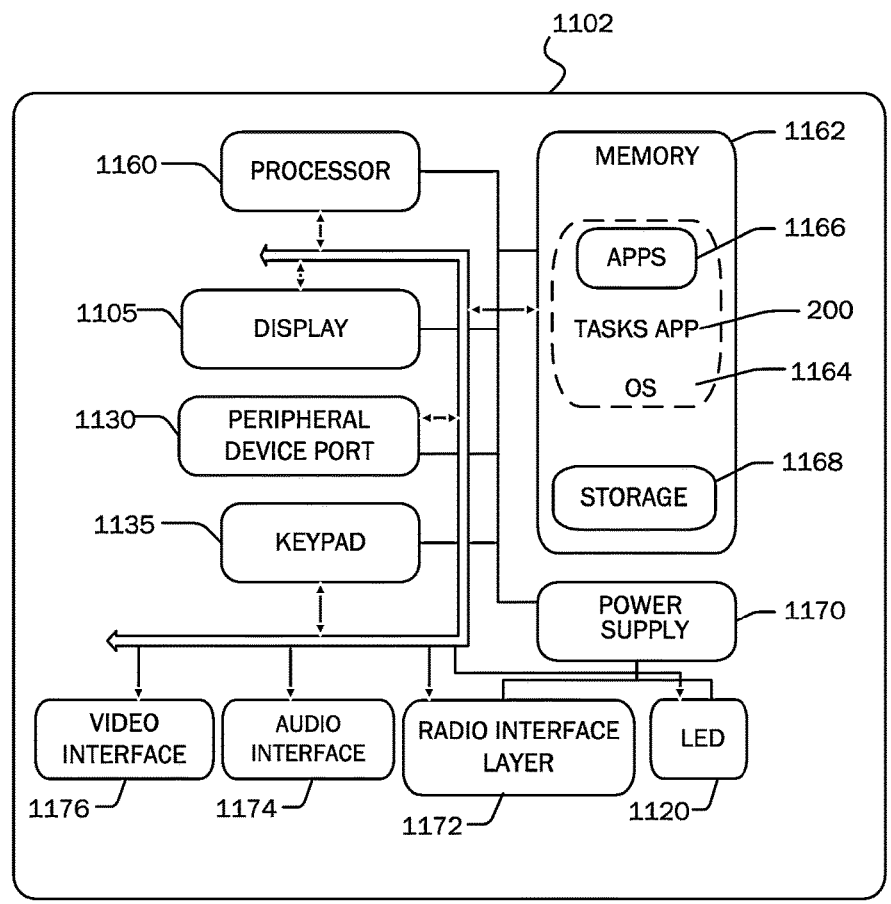
Figure 12:
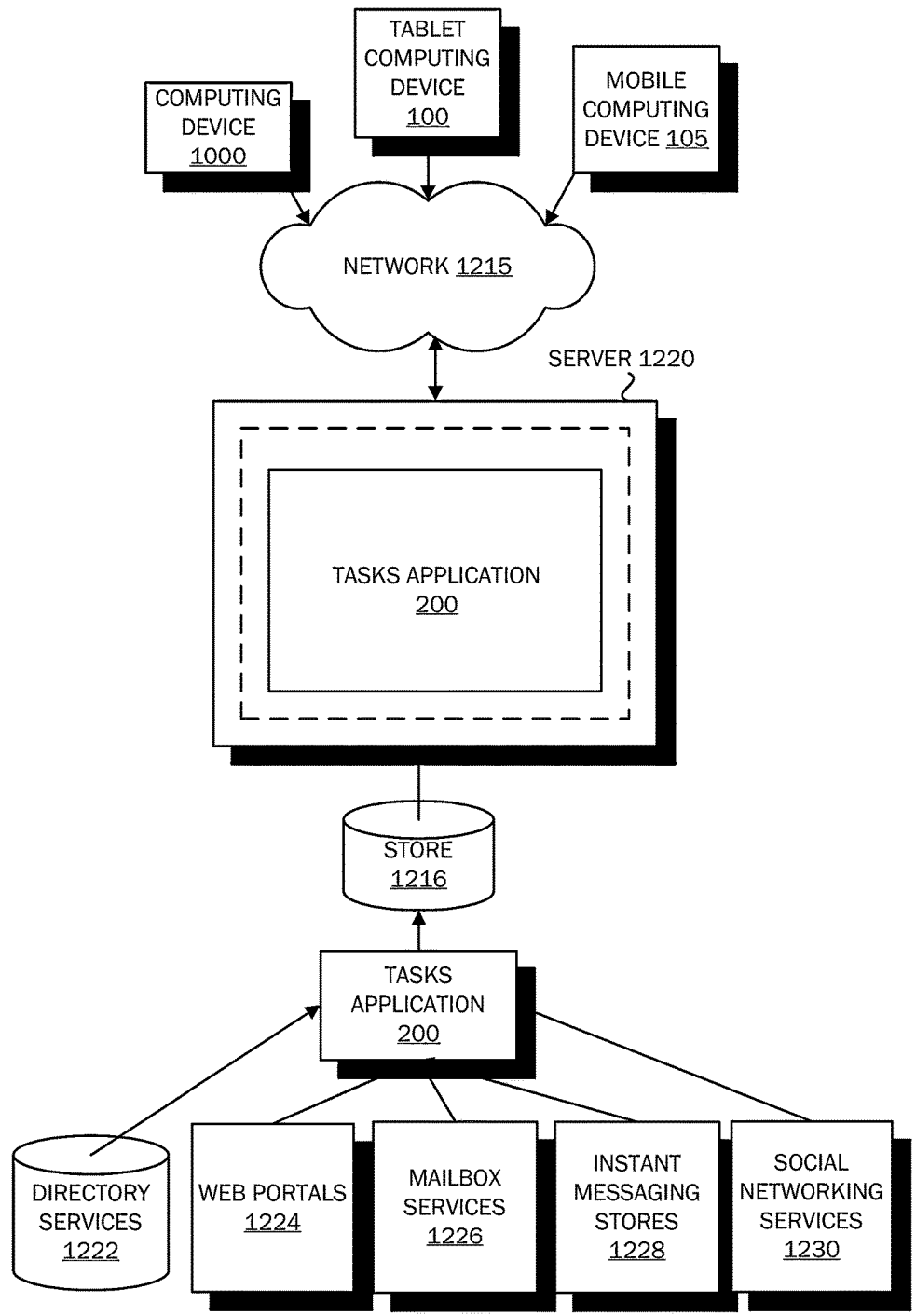
FIG. 12 is a simplified block diagram of a distributed computing system in which embodiments of the present invention may be practiced.

FIGS. 11A and 11B illustrate a suitable mobile computing environment, for example, a mobile telephone 105, a smartphone, a tablet personal computer, a laptop computer, and the like, with which embodiments of the invention may be practiced. With reference to FIG. 11A, an example mobile computing device 105 for implementing the embodiments is illustrated. In a basic configuration, mobile computing device 105 is a handheld computer having both input elements and output elements. Input elements may include touch screen display 1105 and input buttons 1110 that allow the user to enter information into mobile computing device 105. Mobile computing device 105 may also incorporate an optional side input element 1115 allowing further user input. Optional side input element 1115 may be a rotary switch, a button, or any other type of manual input element. In alternative embodiments, mobile computing device 105 may incorporate more or less input elements. For example, display 1105 may not be a touch screen in some embodiments. In yet another alternative embodiment, the mobile computing device is a portable phone system, such as a cellular phone having display 1105 and input buttons 1110. Mobile computing device 105 may also include an optional keypad 1135. Optional keypad 1135 may be a physical keypad or a "soft" keypad generated on the touch screen display.

Mobile computing device 105 incorporates output elements, such as display 1105, which can display a graphical user interface (GUI). Other output elements include speaker 1125 and LED light 1120. Additionally, mobile computing device 105 may incorporate a vibration module (not shown), which causes mobile computing device 105 to vibrate to notify the user of an event. In yet another embodiment, mobile computing device 105 may incorporate a headphone jack (not shown) for providing another means of providing output signals.

FIG. 11B is a block diagram illustrating components of a mobile computing device used in one embodiment, such as the computing device shown in FIG. 11A. That is, mobile computing device 105 can incorporate system 1102 to implement some embodiments. For example, system 1102 can be used in implementing a "smart phone" that can run one or more applications similar to those of a desktop or notebook computer such as, for example, browser, e-mail, scheduling, instant messaging, and media player applications. In some embodiments, system 1102 is integrated as a computing device, such as an integrated personal digital assistant (PDA) and wireless phone.

One or more application programs 1166 may be loaded into memory 1162 and run on or in association with operating system 1164. Examples of application programs include phone dialer programs, e-mail programs, PIM (personal information management) programs, word processing programs, spreadsheet programs, Internet browser programs, messaging programs, and so forth. System 1102 also includes non-volatile storage 1168 within memory 1162. Non-volatile storage 1168 may be used to store persistent information that should not be lost if system 1102 is powered down. Applications 1166 may use and store information in non-volatile storage 1168, such as e-mail or other messages used by an e-mail application, and the like. A synchronization application (not shown) also resides on system 1102 and is programmed to interact with a corresponding synchronization application resident on a host computer to keep the information stored in non-volatile storage 1168 synchronized with corresponding information stored at the host computer. As should be appreciated, other applications may be loaded into memory 1162 and run on the device 105 including the tasks application 200, described herein.

System 1102 has a power supply 1170, which may be implemented as one or more batteries. Power supply 1170 might further include an external power source, such as an AC adapter or a powered docking cradle that supplements or recharges the batteries.

System 1102 may also include a radio 1172 that performs the function of transmitting and receiving radio frequency communications. Radio 1172 facilitates wireless connectivity between system 1102 and the "outside world", via a communications carrier or service provider. Transmissions to and from radio 1172 are conducted under control of OS 1164. In other words, communications received by radio 1172 may be disseminated to application programs 1166 via OS 1164, and vice versa.

Radio 1172 allows system 1102 to communicate with other computing devices, such as over a network. Radio 1172 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

This embodiment of system 1102 is shown with two types of notification output devices; LED 1120 that can be used to provide visual notifications and an audio interface 1174 that can be used with speaker 1125 to provide audio notifications. These devices may be directly coupled to power supply 1170 so that when activated, they remain on for a duration dictated by the notification mechanism even though processor 1160 and other components might shut down for conserving battery power. LED 1120 may be programmed to remain on indefinitely until the user takes action to indicate the powered-on status of the device. Audio interface 1174 is used to provide audible signals to and receive audible signals from the user. For example, in addition to being coupled to speaker 1125, audio interface 1174 may also be coupled to a microphone 1120 to receive audible input, such as to facilitate a telephone conversation. In accordance with embodiments of the present invention, the microphone 1120 may also serve as an audio sensor to facilitate control of notifications, as will be described below. System 1102 may further include video interface 1176 that enables an operation of on-board camera 1130 to record still images, video stream, and the like.

A mobile computing device implementing system 1102 may have additional features or functionality. For example, the device may also include additional data storage devices (removable and/or non-removable) such as, magnetic disks, optical disks, or tape. Such additional storage is illustrated in FIG. 11B by storage 1168. Computer storage media may include volatile and nonvolatile, removable and non-removable media implemented in any method or technology for storage of information, such as computer readable instructions, data structures, program modules, or other data.

Data/information generated or captured by the device 105 and stored via the system 1102 may be stored locally on the device 105, as described above, or the data may be stored on any number of storage media that may be accessed by the device via the radio 1172 or via a wired connection between the device 105 and a separate computing device 1000, 1203 associated with the device 105, for example, a server computer in a distributed computing network, such as the Internet. As should be appreciated such data/information may be accessed via the device 105 via the radio 1172 or via a distributed computing network. Similarly, such data/information may be readily transferred between computing devices for storage and use according to well-known data/information transfer and storage means, including electronic mail and collaborative data/information sharing systems.

FIG. 12 illustrates a system architecture for providing list items and task items captured via voice and/or audio recording to various client devices via a distributed computing environment after generation as described above. As described previously, a tasks application 200 allows for generation, personalization and utilization of one or more task and/or list items. List items and task items along with information from which they are developed may be stored using directory services 1222, web portals 1224, mailbox services 1226, instant messaging stores 1228 and social networking sites 1230. The system/application 200 may use any of these types of systems or the like for developing list items and task items and for storing same in a store 1216. A server 1220 may provide list items and task items to clients. As one example, server 1220 may be a web server providing list items and task items over the web. Server 1220 may provide online list items and task items over the web to clients through a network 1215. Examples of clients that may obtain list items and task items include computing device 1000, which may include any general purpose personal computer 1000, a tablet computing device 100 and/or mobile computing device 105 which may include smart phones. Any of these devices may obtain list items and task items from the store 1216.

Embodiments of the present invention, for example, are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the invention have been described, other embodiments may exist. Furthermore, although embodiments of the present invention have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the invention.

It will be apparent to those skilled in the art that various modifications or variations may be made in the present invention without departing from the scope or spirit of the invention. Other embodiments of the invention will be apparent to those skilled in the art from consideration of the specification and practice of the invention disclosed herein.

We claim:

1. A method of personalizing electronically-enabled task items, comprising:
   generating a listing of a plurality of tasks with a tasks application;
   displaying a first task user interface of the tasks application including;
      the listing of the plurality of task items;
      a doodling pane and a gaming pane, the gaming pane including a user-interactive game, wherein the listing of the plurality of task items, the doodling pane and the game pane are displayed concurrently within the first task user interface;

receiving an ink input via the doodling pane;

associating the ink input with one of the plurality of task items and associating the user-interactive game with another of the plurality of task items;

after associating the ink input with the one task item and the user-interactive game with the another task item, display a subsequent listing of the plurality of task items in a second task user interface without displaying either the associated ink input or the associated user-interactive game; and when a selection of the one task item from the subsequent listing is received, opening the one task item and displaying the one task item concurrently with the associated ink input; and when a selection of the another task item from the subsequent listing is received, opening the another task item and displaying the another task item concurrently with the associated user-interactive game.

2. The method of claim 1, wherein associating the ink input with the one of the plurality of task items includes electronically dragging and dropping the one task item on the doodling pane.

3. The method of claim 1, wherein associating the ink input with the one of the plurality of task items includes applying a metadata item to the ink input and associating the metadata item with the one task item.

4. The method of claim 1, further comprising associating the ink input with the entire listing of the plurality of task items.

5. The method of claim 1, wherein the subsequent listing of the plurality of items is shared across a network with a group comprising a plurality of users and wherein selection of at least one task by any of plurality of users causes a concurrent display of the at least one task item and its associated ink input in the doodling pane, its associated user-interactive game in the gaming pane, or both its associated ink input in the doodling pane and its associated user-interactive game in the gaming pane.

6. A method of personalizing electronically-enabled task items, comprising:

generating a listing of a plurality of task items with a tasks application;

displaying a first task user interface including:
  the listing of the plurality of task items; and
  a user-interactive doodling pane and a gaming pane, the gaming pane including a user-interactive game, wherein the listing of the plurality of task items, the user-interactive doodling pane and the game pane are displayed concurrently in the first task user interface;

associating a user-created sketch entered via the user-interactive doodling pane with one of the plurality of task items and associating the user-interactive game with another of the plurality of task items;

after associating the user-created sketch with the one task item and after associating the user-interactive game with the another task item, display a subsequent listing of the plurality of task items in a second task user interface without displaying either the associated user-created sketch or the associated user-interactive game;

when a selection of the one task item from the subsequent listing is received, opening the one task item and displaying the one task item concurrently with the associated user-created sketch; and when a selection of the another task item from the subsequent listing is received, opening the another task item and displaying the another task item concurrently with the associated user-interactive game.

7. The method of claim 6, wherein associating the user-created sketch with the one of the plurality of task items includes electronically dragging and dropping the one task item on the doodling pane.

8. The method of claim 6, wherein associating the user-created sketch with the one of the plurality of task items includes applying a metadata item to the user-created sketch and associating the metadata item with the one task item.

9. The method of claim 6, further comprising associating the user-created sketch with the listing of the plurality of task items.

10. The method of claim 6, wherein the subsequent listing of the plurality of task items is shared across a network with a group comprising a plurality of users and wherein selection of at least one task item by any of plurality of users causes a concurrent display of the at least one task item and its associated user-created sketch in the doodling pane, its associated user-interactive game in the gaming pane, or both its user-created sketch in the doodling pane and its associated user-interactive game in the gaming pane.

11. A system for personalizing electronically-enabled task items, comprising:

a display device;

a memory storing instructions; and a processor, wherein execution of the stored instructions causes the processor to:
  generate a listing of a plurality of task items with a tasks application;
  display a first task user interface including:
    the listing of the plurality of task items; and
    a user-interactive doodling pane and a gaming pane, the gaming pane including a user-interactive game, wherein the listing of the plurality of task items, the user-interactive doodling pane and the game pane are displayed concurrently in the first task user interface;
  associate a user-created sketch entered via the user-interactive doodling pane with one of the plurality of task items and associate the user-interactive game with another of the plurality of task items;
  after associating the user-created sketch with the one task item and after associating the user-interactive game with the another task item, display a subsequent listing of the plurality of task items in a second task user interface without displaying either the associated user-created sketch or the associated user-interactive game;
  when a selection of the one task item from the subsequent listing is received, opening the one task item and displaying the one task item concurrently with the associated user-created sketch; and
  when a selection of the another task item from the subsequent listing is received, opening the another task item and displaying the another task item concurrently with the associated user-interactive game.

* * * * *